(12) United States Patent  
Esposito et al.

(10) Patent No.: US 9,562,292 B2  
(45) Date of Patent: Feb. 7, 2017

(54) PHOTOACTIVE ARTICLE, PROCESS FOR MAKING, AND USE OF SAME

(71) Applicant: NATIONAL INSTITUTE OF STANDARDS AND TECHNOLOGY, Gaithersbrug, MD (US)

(72) Inventors: Daniel V. Esposito, Gaithersburg, MD (US); Thomas P. Moffat, Gaithersburg, MD (US); Albert Alec Talin, Livermore, CA (US)

(73) Assignee: THE UNITED STATES OF AMERICA, AS REPRESENTED BY THE SECRETARY OF COMMERCE, Washington, DC (US)

(*) Notice: Subject to any disclaimer, the term of this patent is extended or adjusted under 35 U.S.C. 154(b) by 204 days.

(21) Appl. No.: 14/269,411

(22) Filed: May 5, 2014

(65) Prior Publication Data

US 2014/0318978 A1    Oct. 30, 2014

(51) Int. Cl.
*C25B 1/02* (2006.01)
*C25B 11/04* (2006.01)
(Continued)

(52) U.S. Cl.
CPC .............. *C25B 1/02* (2013.01); *C25B 1/003* (2013.01); *C25B 11/04* (2013.01); *H01G 9/2045* (2013.01); *Y02E 10/542* (2013.01); *Y02P 70/521* (2015.11)

(58) Field of Classification Search
CPC ........... C25B 1/02; C25B 1/003; C25B 11/04; H01G 9/2045; Y02P 70/521; Y02P 70/54; H01M 10/052; H01M 10/0562; H01M 10/0585; H01M 10/465; H01M 14/005; H01M 2/202; H01L 31/022433; H01L 31/0504; Y02E 60/122; Y02E 10/542; Y02E 10/50

See application file for complete search history.

(56) References Cited

U.S. PATENT DOCUMENTS 4,180,771 A    12/1979   Guckel
4,486,292 A    12/1984   Blackburn
(Continued)

FOREIGN PATENT DOCUMENTS

EP      0471269         2/1992
WO      WO2005036156    4/2005
WO      2011116750 A2   9/2011

OTHER PUBLICATIONS

H. Águas, S. Pereira, D. Costa, P. Barquinha, L. Pereira, E. Fortunato, and R. Martins, "3 dimensional polymorphous silicon based metal-insulator-semiconductor position sensitive detectors," Thin Solid Films, vol. 515, No. 19, pp. 7530-7533, Jul. 2007.

(Continued)

*Primary Examiner* — Xiuyu Tai
(74) *Attorney, Agent, or Firm* — Tody D. Hain

(57) ABSTRACT

A photoactive article includes a substrate including a semiconductor to absorb light and to produce a plurality of charge carriers; a dielectric layer disposed on the substrate; a conductive member disposed on the dielectric layer and opposing the substrate such that the dielectric layer is exposed by the conductive member, the conductive member to receive a portion of the plurality of charge carriers from the substrate; and an electrolyte disposed on the dielectric layer and the conductive member. Making a photoactive article includes forming a dielectric layer on a substrate by rapid thermal oxidation, the dielectric layer comprising an oxide of a semiconductor; and forming a conductive member disposed on the dielectric layer.

18 Claims, 20 Drawing Sheets

(51) Int. Cl.
*C25B 1/00* (2006.01)
*H01G 9/20* (2006.01)

(56) References Cited

U.S. PATENT DOCUMENTS

| | | | | |
|---|---|---|---|---|
| 4,492,813 | A * | 1/1985 | Kausche | H01L 31/022425 136/256 |
| 4,514,263 | A | 4/1985 | Janata | |
| 5,417,821 | A | 5/1995 | Pyke | |
| 7,893,347 | B2 | 2/2011 | Lewerenz | |
| 7,977,254 | B2 | 7/2011 | Peng et al. | |
| 8,221,599 | B2 | 7/2012 | Chidsey et al. | |
| 8,492,874 | B2 | 7/2013 | Lan et al. | |
| 2012/0216854 | A1 | 8/2012 | Chidsey et al. | |
| 2013/0095392 | A1* | 4/2013 | Shin | H01G 9/2013 429/338 |
| 2014/0113180 | A1* | 4/2014 | Nakai | H01M 10/052 429/160 |

OTHER PUBLICATIONS

A. T. Howe and T. H. Fleisch, "Photoelectrochemical Cells of the Electrolyte-Metal-Insulator-Semiconductor (EMIS) Configuration II. Use of Non-native Oxides in Pt/oxide/n-Si Systems," J. Electrochem. Soc., vol. 134, No. 1, pp. 72-76, Jan. 1987.

A. T. Howe, R. T. Hawkins, and T. H. Fleisch, "Photoelectrochemical Cells of the Electrolyte-Metal-Insulator-Semiconductor (EMIS) Configuration I. Metal Thickness and Coverage Effects in the Pt/Silicon Oxide/n-Si System," J. Electrochem. Soc., vol. 133, No. 7, pp. 1369-1375, Jul. 1986.

Y. Irokawa, Y. Sakuma, and T. Sekiguchi, "Effect of Dielectrics on Hydrogen Detection Sensitivity of Metal-Insulator-Semiconductor Pt-GaN Diodes," Jpn. J. Appl. Phys., vol. 46, No. 12R, p. 7714, Dec. 2007.

S. Krause, H. Talabani, M. Xu, W. Moritz, and J. Griffiths, "Scanning photo-induced impedance microscopy—an impedance based imaging technique," Electrochimica Acta, vol. 47, No. 13-14, pp. 2143-2148, May 2002.

M.-L. Lee, T. S. Mue, F. W. Huang, J. H. YANGang, and J. K. Sheu, "High-performance GaN metal insulator semiconductor ultraviolet photodetectors using gallium oxide as gate layer," Opt. Express, vol. 19, No. 13, pp. 12658-12663, Jun. 2011.

A. A. Milgram, "Ion-induced electrical breakdown in metal-oxide-silicon capacitors," Journal of Applied Physics, vol. 67, No. 3, pp. 1461-1470, Feb. 1990.

K. Stella, D. A. Kovacs, and D. Diesing, "Photosensitive Metal-Insulator-Semiconductor Devices with Stepped Insulating Layer," Electrochem. Solid-State Lett., vol. 12, No. 12, pp. H453-H455, Dec. 2009.

A. A. Vasiliev, V. I. Filippov, Y. A. Dobrovolsky, A. V. Pisareva, W. Moritz, and R. Palombari, "Hydrogen sensors based on metal-insulator-semiconductor structures with a layer of a proton-conducting solid electrolyte," Russ J Electrochem, vol. 43, No. 5, pp. 561-569, May 2007.

E. Yalon, S. Cohen, A. Gavrilov, and D. Ritter, "Evaluation of the local temperature of conductive filaments in resistive switching materials," Nanotechnology, vol. 23, No. 46, p. 465201, Nov. 2012.

S.-M. Yoon, S.-H. K. Park, C.-W. Byun, S.-H. Yang, and C.-S. Hwang, "Electrical Characterization of Metal-Insulator-Semiconductor Capacitors Having Double-Layered Atomic-Layer-Deposited Al2O3 and ZnO for Transparent Thin Film Transistor Applications," J. Electrochem. Soc., vol. 157, No. 7, pp. H727-H733, Jul. 2010.

Y. Zhang, T.-T. Tang, C. Girit, Z. Hao, M. C. Martin, A. Zettl, M. F. Crommie, Y. R. Shen, and F. Wang, "Direct observation of a widely tunable bandgap in bilayer graphene," Nature, vol. 459, No. 7248, pp. 820-823, Jun. 2009.

Proton Conductors, Solid, Membranes and Gels, ed. by Philippe Colomban, (Cambridge University Press, 1992).

A. G. Munoz et al., Advances in Photoelectrocatalysis with Nanotopographical Photoelectrodes, ChemPhysChem, 2010, 1603-1615, vol. 11.

H. J. Lewerenz et al, Micro- and nanotopographies for photoelectrochemical energy conversion. II: Photoelectrocatalysis—Classical and advanced systems, Electrochimica Acta, 2011, 10726-10736, vol. 56.

Y. W. Chen et al., Atomic layer-deposited tunnel oxide stabilizes silicon photoanodes for water oxidation, Nature Materials, 2011, 539-544, vol. 10.

H. J. Lewerenz et al, Photoelectrocatalysis: Principles, nanoemitter applications and routes to bio-inspired systems, Energy & Environmental Science, 2010, 748-760, vol. 3.

A. G. Scheuermann et al., Effects of catalyst material and atomic layer deposited TiO2 oxide thickness on the water oxidation performance of metal-insulator-silicon anodes, Energy & Environmental Science, 2013, 2487-2496, vol. 6.

S. Liu et al, Colossal Lateral Photovoltaic Effect Observed in Metal-Oxide-Semiconductor Structure of Ti/TiO2/Si, IEEE Electron Device Letters, 2012, 414-416, vol. 33, No. 3.

C. Yu et al., Large Lateral Photovoltaic Effect in Metal-(Oxide-) Semiconductor Structures, Sensors, 2010, 10155-10180, vol. 10.

* cited by examiner

# PHOTOACTIVE ARTICLE, PROCESS FOR MAKING, AND USE OF SAME

STATEMENT REGARDING FEDERALLY SPONSORED RESEARCH

This invention was made with United States government support from the National Institute of Standards and Technology. The government has certain rights in the invention.

BACKGROUND

Photovoltaic materials are a promising source of efficient energy production. However, they have limited application due to charge carrier recombination, which limits not only energy conversion but also integration of the material into certain devices.

Accordingly, photoactive articles and methods for their production would be advantageous and favorably received in the art.

BRIEF DESCRIPTION

The above and other deficiencies are overcome by, in an embodiment, a photoactive article comprising: a substrate comprising a semiconductor to absorb light and to produce a plurality of charge carriers; a dielectric layer disposed on the substrate; a conductive member disposed on the dielectric layer and opposing the substrate such that the dielectric layer is exposed by the conductive member, the conductive member to receive the plurality of charge carriers from the substrate; and an electrolyte disposed on the dielectric layer and the conductive member.

Further disclosed is a photoactive article comprising: a substrate comprising a semiconductor to absorb light and to produce a plurality of charge carriers in response to absorption of light; a dielectric layer disposed on the substrate and comprising a semiconductor oxide produced by rapid thermal oxidation of the semiconductor; and a conductive member disposed on the dielectric layer and opposing the substrate such that the dielectric layer is exposed by the conductive member, the conductive member to receive the plurality of charge carriers from the substrate.

Additionally disclosed is a process for making a photoactive device, the process comprising: forming a dielectric layer on a substrate comprising a semiconductor by rapid thermal oxidation of the semiconductor, the dielectric layer comprising an oxide of the semiconductor; and forming a conductive member disposed on the dielectric layer by disposing a first metal on the dielectric layer to form the photoactive device.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments is presented herein by way of exemplification and not limitation.

It has been found that a photoactive article has advantageous and unexpected energy harvesting and photo detection characteristics. The photoactive article includes a dielectric layer that separates a light-absorbing substrate from a conductive member. The dielectric layer protects the substrate from corrosive materials that include an electrolyte. Moreover, the photoactive article exhibits low carrier recombination at an interface of the dielectric layer and substrate.

The structure of the photoactive article can have a high built-in voltage across the photoactive article. Furthermore, the dielectric layer is a high quality, low-defect dielectric layer formed by rapid thermal oxidation. The conductive member can include a plurality of metals, and a combination of the different metals in the conductive member separates a solid-state function from an electrochemical function of the conductive member. Beneficially, the photoactive article includes an inversion layer in the substrate resulting from presence of the electrolyte in contact with the dielectric layer so that the photoactive article exhibits an enhanced charge carrier effective diffusion length. As such, the photoactive article benefits from a long-distance carrier collection by the conductive member of photo-generated charge carriers created in the substrate. In an energy application, electrochemical hydrogen production is enhanced by an arrangement of a plurality of conductive members in the photoactive articles that exposes the dielectric layer to the electrolyte.

Figure 1:
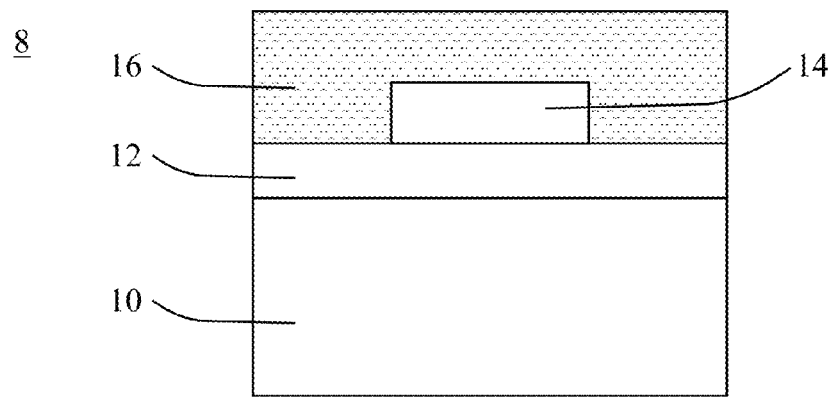
FIG. 1 shows a cross-section of a photoactive article.
Figure 2:
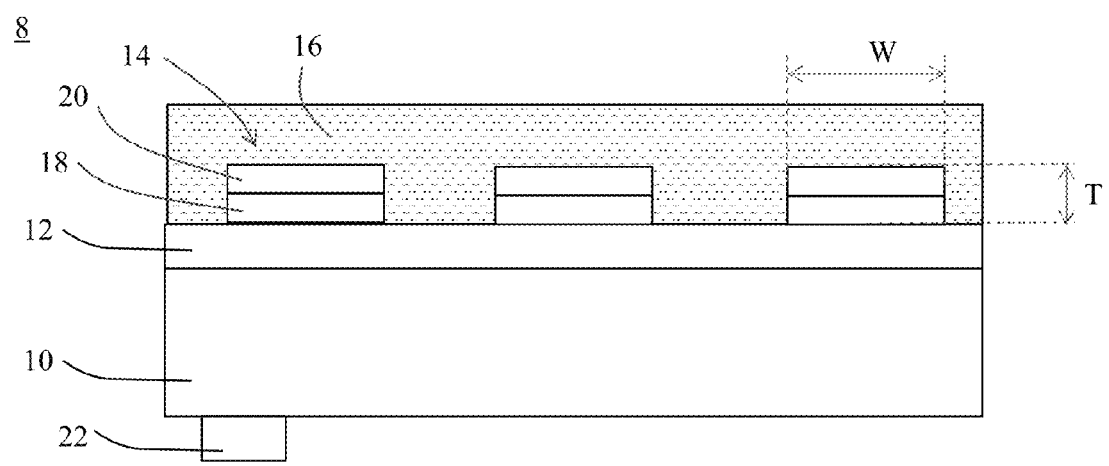
FIG. 2 shows a cross-section of a photoactive article.
Figure 3A:
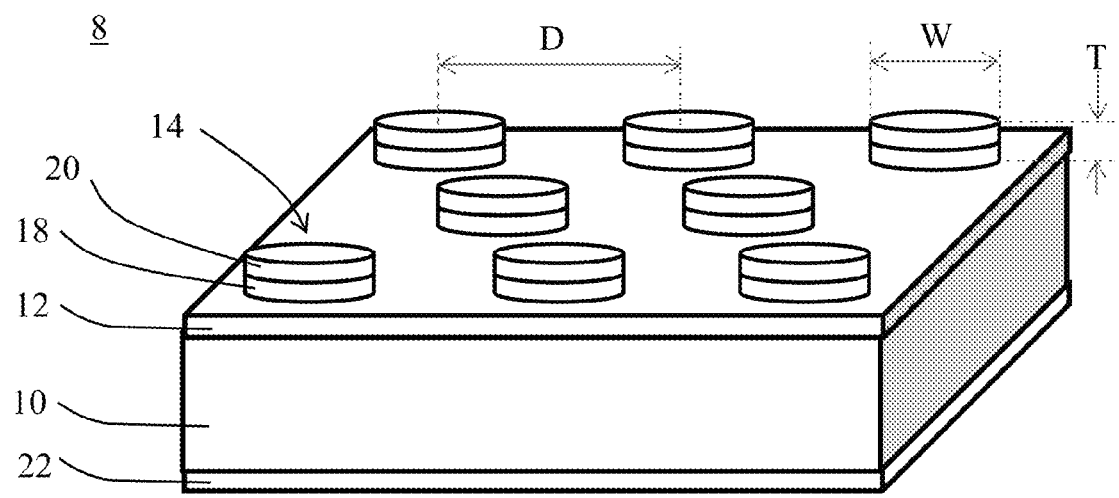
FIGS. 3A and 3B respectively show a perspective view of a photoactive article and a micrograph of a photoactive article.
Figure 3B:
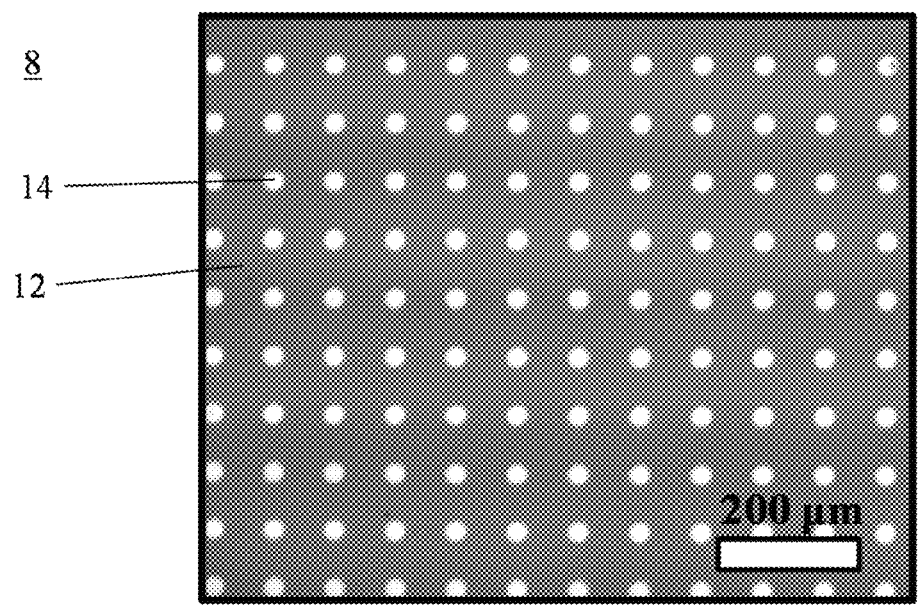

According to an embodiment as shown in FIG. 1, photoactive article 8 includes substrate 10 and dielectric layer 12 disposed thereon. Conductive member 14 is disposed on dielectric layer 12 with a portion of the dielectric layer 12 exposed by conductive member 14. Electrolyte 16 is disposed on dielectric layer 12 and conductive member 14. In an embodiment, photoactive article 8 includes a plurality of conductive members 14 and metal contact 22 as shown in FIG. 2 and FIG. 3A. Conductive members 14 independently have a width W and thickness T. The metal contact 22 can be disposed over an entire surface of substrate 10 as in FIG. 2 or a portion of substrate 10 as in FIG. 3A. A shape of metal contact 22 can be the same or different as a shape of substrate 10, including a cross-sectional shape such as circular, polygonal, irregular, elliptical, and the light, provided that metal contact 22 contacts substrate 10 in order to communicate charged species, e.g., electrons or holes, with substrate 10. FIG. 3B shows an optical image of a top surface of a photoactive article. Here, conductive members 14 have a circular transverse cross-section with a diameter of 27 µm, and distance D is 107 µm. The substrate includes consists of p-Si (100), dielectric is 2 nm thick $SiO_2$, and metallic layer consists of 20 nm thick Pt on 30 nm thick Ti.

Figure 4:
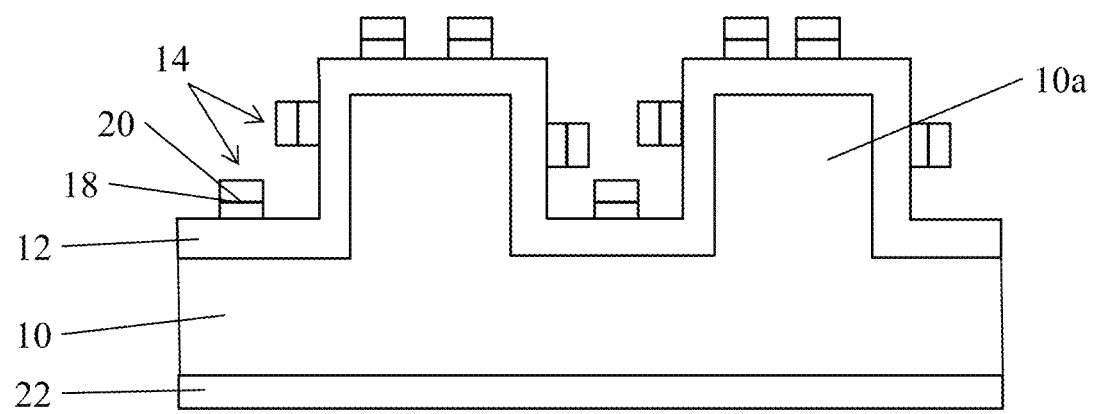
FIGS. 4 and 5 respectively show a cross-section of photoactive article and a micrograph of a substrate with protrusions of a photoactive article.
Figure 5:
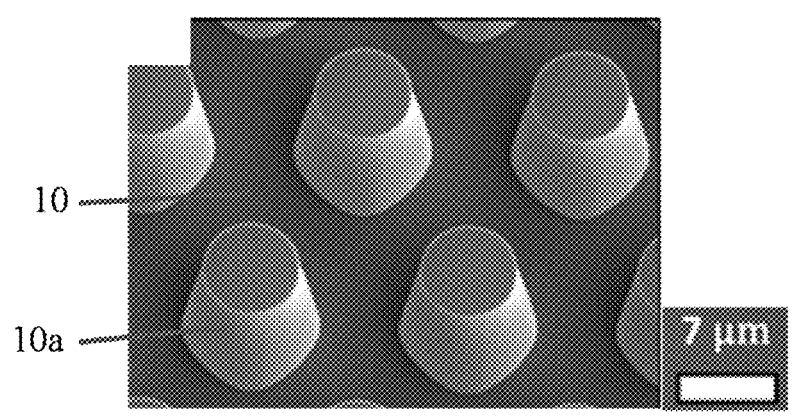

In an embodiment, conductive member 14 is a single metal, e.g., first metal 18, or a plurality of metals, e.g., first metal 18 disposed on dielectric layer 12 with second metal 20 disposed on first metal 18. In some embodiments, a plurality of conductive members 14 are disposed on dielectric layer 12 and arranged with a distance D between adjacent conductive members 14. According to an embodiment, a plurality of conductive members 14 are disposed on dielectric layer 12 with different distances D between the conductive members 14. Conductive member 14 can have any shape so long as first metal 18 is disposed on dielectric 12 such that efficient transport of charge carriers (e.g., holes, electrons, and the like) between substrate 10 and conductive member 14 can occur. Exemplary shapes of conductive member 14 include cylindrical, cone, frustonical, hemispherical, cuboidal, and the like. According to an embodiment, the conductive member 14 has a cylindrical shape and circular transverse cross-section. In certain embodiments, as shown in FIG. 4, substrate 10 includes protrusion 10a such that dielectric layer 18 has a non-planar geometry on which first electrode 14 is disposed. A scanning electron micrograph is shown in FIG. 5 for a substrate having a plurality of protrusions 10a conductive member 14. Protrusions 10a can have a frustoconical shape although a shape of protrusions 10a of substrate 10 are not limited thereto.

Figure 6A:
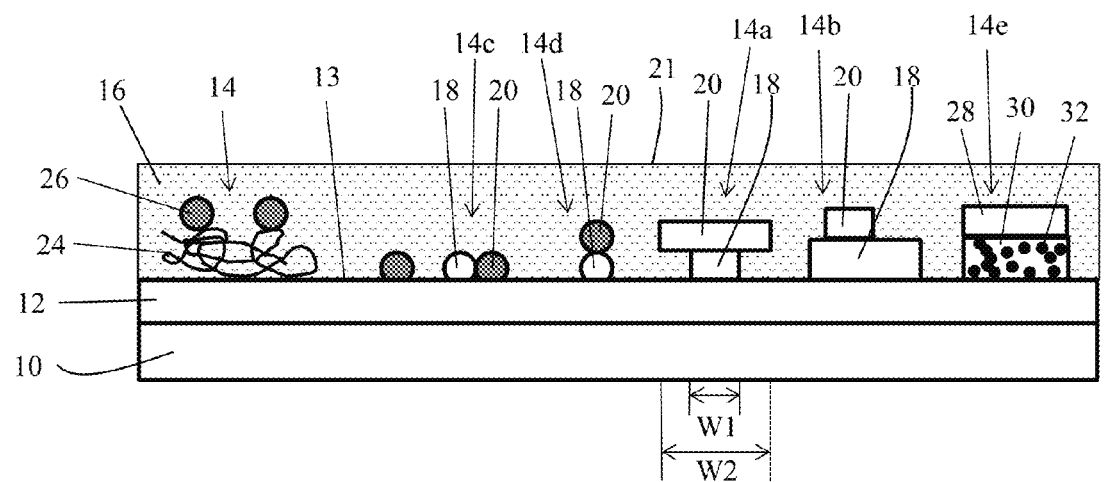
FIGS. 6A, 6B, and, 6C show cross-sections of a photoactive article with a plurality of conductive members.

According to an embodiment, conductive member 14 has a circular shape transverse cross-section as shown in FIG. 3. In some embodiments, the conductive member 14 is highly transparent to transmit light through conductive member 14 to substrate 10. Generally, conductive member 14 has a shape given by a component metal (e.g., first metal 18 and the like) or combination component (e.g., first metal 18, second metal 20, and the like). In some embodiments, first metal 14 and second metal 18 have a same shape, a different shape, or a combination thereof when combined in a single conductive member or separately disposed on dielectric layer. As shown in FIG. 6A, conductive member can include mesh 24 (e.g. metal turnings, metallic wool, metallic weave, reticulated metal, metallic weave, and the like), particle 26 (e.g., particles with a smallest linear dimension in the nanometer or micrometer range such as nanoparticle, microparticles, and the like), film 28, porous metal 30 (e.g., a metal foam) having a plurality of pores 32, a combination comprising at least one of the foregoing, and the like. In one embodiment, conductive e member 14a includes first metal 18 having first width W1 that is less than second width W2 of second metal 20 disposed on first metal 18 to create undercut 21. In another embodiment, conductive member 14b includes first metal 18 having first width W1 that is greater than second width W2 of second metal 20 disposed on first metal 18 to create undercut 21. In one embodiment, conductive member 14c includes first metal 18 and second metal 20 disposed on dielectric layer 12 and arranged side-by-side with respect to surface 13 of dielectric layer 12 or arranged in a stacked fashion as in conductive member 14d. Moreover, first metal 18 and second metal 20 can be aligned symmetrically as in conductive members 14d, 14e or aligned asymmetrically as in conductive members 14a, 14b.

Figure 6B:
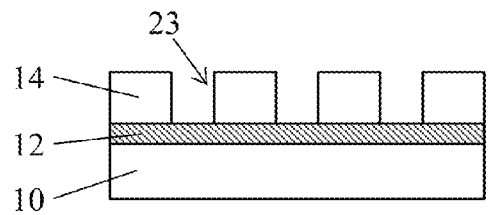
Figure 6C:
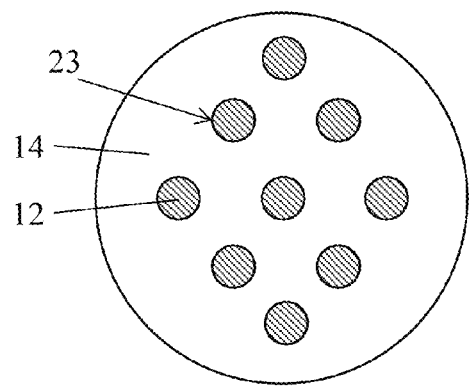

In some embodiments, conductive members 14 are discretely disposed on dielectric layer 12 as shown in FIGS. 4 and 5. In another embodiment, conductive member 14 is a continuous member that includes opening 23 such that dielectric layer 12 is exposed by opening 23 as in the transverse cross-section and top view of a photoactive article respectively shown in FIGS. 6B and 6C. It should be appreciated that the photoactive article can have various shapes such as those that can be formed using nanofabrication, and microfabrication techniques, or bulk techniques (e.g., polishing, cutting, sputtering, and the like).

Figure 7:
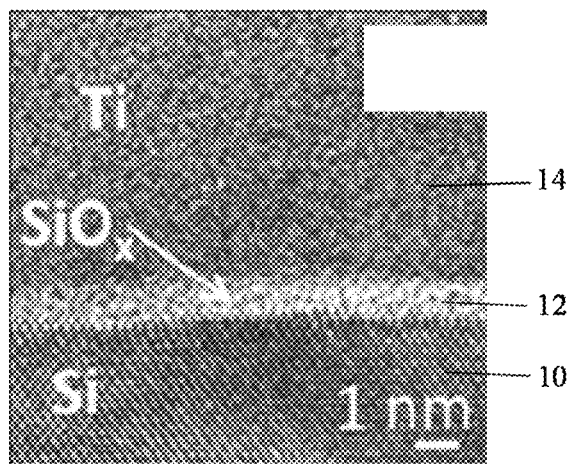
FIG. 7 shows a cross-section of a photoactive device.

According to an embodiment, a photoactive article includes a substrate (which can include e.g., a semiconductor) to absorb light and to produce a plurality of charge carriers; a dielectric layer disposed on the substrate; a conductive member disposed on the dielectric layer and opposing the substrate such that the dielectric layer is exposed by the conductive member such that the conductive member can receive the plurality of charge carriers from the substrate, and an electrolyte disposed on the dielectric layer and the conductive member. In an embodiment, the conductive member includes a first metal disposed on the dielectric layer and a second metal disposed on the first metal, wherein the first metal and second metal are arranged in a plurality of layers. Moreover, a plurality of conductive members can be disposed on the dielectric layer such that the conductive members are electrically isolated from each other. The conductive members can be porous, continuous, or discrete. Additionally, the first metal and the second metal are independently a layer, a nanoparticle, a porous layer, a powder, a foam, or a combination comprising at least one of the foregoing. The photoactive article can also include a metal contact disposed on the substrate opposing the dielectric layer. In a particular embodiment, as shown in the micrograph in FIG. 7, the photoactive article includes a silicon substrate 10, silicon oxide dielectric layer 12, and titanium conductive member 14.

In an embodiment, the photoactive article is a photoelectrochemical article 9a, 9b, or 9c as shown respectively, e.g., in FIG. 8A, 8B, 9, or 10. Photoelectrochemical article 9a includes substrate 10 having dielectric layer 12 disposed thereon. Conductive member 14 is disposed on and exposes dielectric layer 12 to electrolyte 16, which is interposed between conductive member 14 and electrode 34. Photovoltaic member 36 is disposed on substrate 10 opposing dielectric layer 12. Conductor 38 electrically connects photovoltaic member 36 to electrode 34. In this arrangement, photoelectrochemical article 9a can be subjected to back illumination from light 40. Herein, a direction of illumination is referred to as back illumination or front illumination. The direction of illumination is referenced to the direction light 40 propagates with respect to conductive member 14, substrate 10, and metal contact 22. In back illumination, light 40 propagates through metal contact 22 before reaching the substrate 10 and conductive member 14. It should be appreciated that substrate 10 is selected to absorb light 40 to produce a plurality of charge carriers so that some or none of light 40 is transmitted through substrate 10 to reach dielectric layer 12 or conductive member 14. In front illumination, dielectric layer 12 or conductive member 14 transmit light 40 before light 40 enters substrate 10. According to an embodiment, electrochemical reactions occur at conductive member 14 and electrode 34, and electrolyte 16 communicates a reactant to conductive member 14 or electrode 34. In one embodiment, reduction occurs at conductive member 14 and oxidation at electrode 34. In some embodiments, reduction occurs at electrode 34 and oxidation at conductive member 14. It is contemplated that electrochemical reaction also occurs on dielectric layer 12 (e.g., when chemical species traverse from conductive member 14 onto dielectric layer 12). In some embodiments, an optically transparent, electrically conductive layer (not shown) is disposed on photovoltaic member 36 and interposed between conductor 38 and photovoltaic member 36. This electrically conductive layer provides an electrically conductive interface to interconnect conductor 38 to photovoltaic member 36.

Photovoltaic member 36 is configured to convert some light 40 into photocurrent and deliver photocurrent to electrode 34 via conductor 38 or to receive electrons from electrode 34. Moreover, with respect to photovoltaic member 36 shown in FIG. 9, the photovoltaic member 36 can be semitransparent to transmit some light 40 to substrate 10.

Figure 8A:
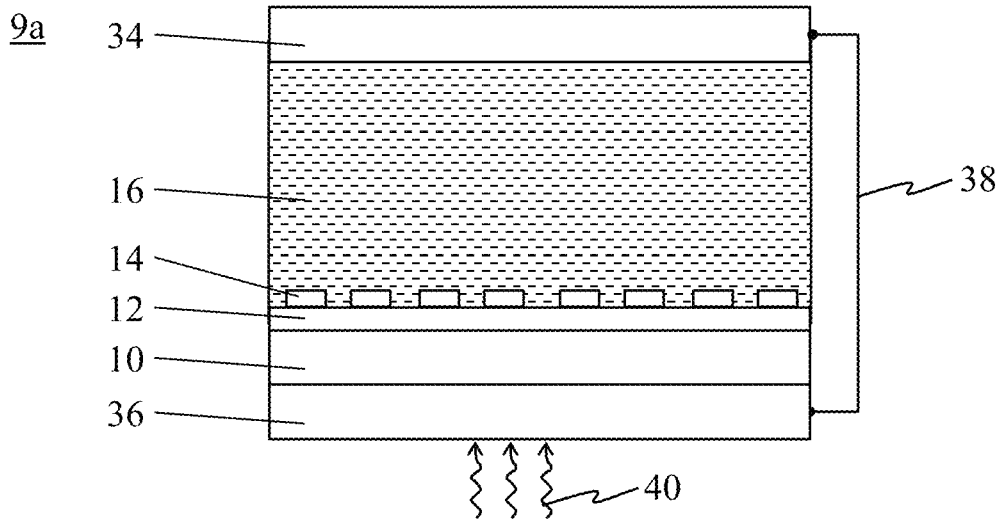
FIGS. 8A and 8B show cross-sections of photoelectrochemical articles subjected to back illumination.
Figure 8B:
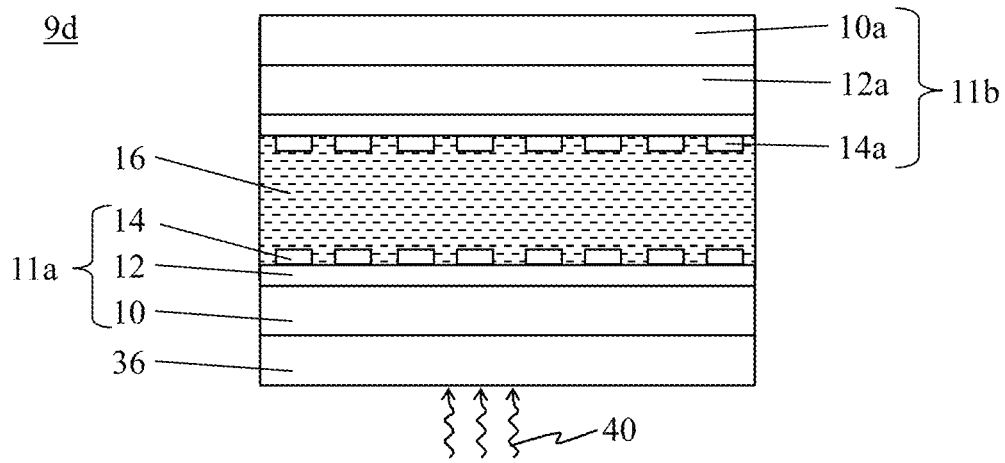
Figure 9:
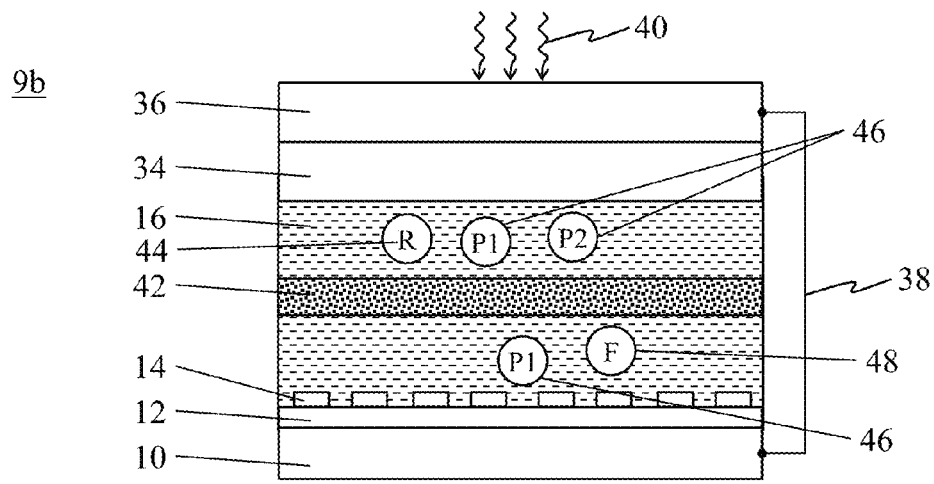
FIG. 9 shows a cross-section of a photoelectrochemical article subjected to front illumination.

In an embodiment of photoelectrochemical article 9d shown in FIG. 8B, first unit 11a (substrate 10, dielectric layer 12, conductive member 14) opposes second unit 11b (substrate 10a, dielectric layer 12a, conductive member 14a), and electrolyte 16 is interposed between first unit 11a and second unit 11b. Although not shown, photovoltaic member 36 and second unit 11b can be electrically connected. Alternatively, another photovoltaic member (not shown) can be connected to substrate 10a of second unit 11b. In an embodiment, substrate 10a of second unit 11b includes a first dopant that is different than a second dopant included in substrate 10 of first unit 11a. The first dopant and second dopant are respectively an n-dopant and p-dopant or a p-dopant and an n-dopant.

According to an embodiment, photoelectrochemical article 9b (FIG. 9) includes photovoltaic member 36 disposed on electrode 34. Here, conductor 38 electrically connects substrate 10 and photovoltaic member 36 to communicate electrons therebetween. Membrane 42 is disposed in electrolyte 16 and interposed between conductive member 14 and electrode 34. In operation, photoelectrochemical article 9b is front illuminated by light 40 initially impinging on photovoltaic member 36, and reactant R contacts electrode 34 to produce, e.g., initial product P1. Membrane 42 can be selectively permeable for initial product P1 such that initial product P1 communicates across membrane 42 to contact conductive member 14. Final product F is formed via contact of initial product P1 with conductive member 14 or dielectric layer 12. In this manner, a first electrochemical half-reaction occurs for contact between reactant R and electrode 34, and a second electrochemical half-reaction occurs for contact between initial product P1 and conductive member 14. In a certain embodiment, reactant R can form a second initial product P2 as an alternative to or in addition to P1. Such behavior can be controlled by selection of reactant R, electrolyte 16, electrode 34, and the like or selection of reaction conditions, e.g., temperature, pH, concentration of chemicals, wavelength of light 40, and the like.

Figure 10:
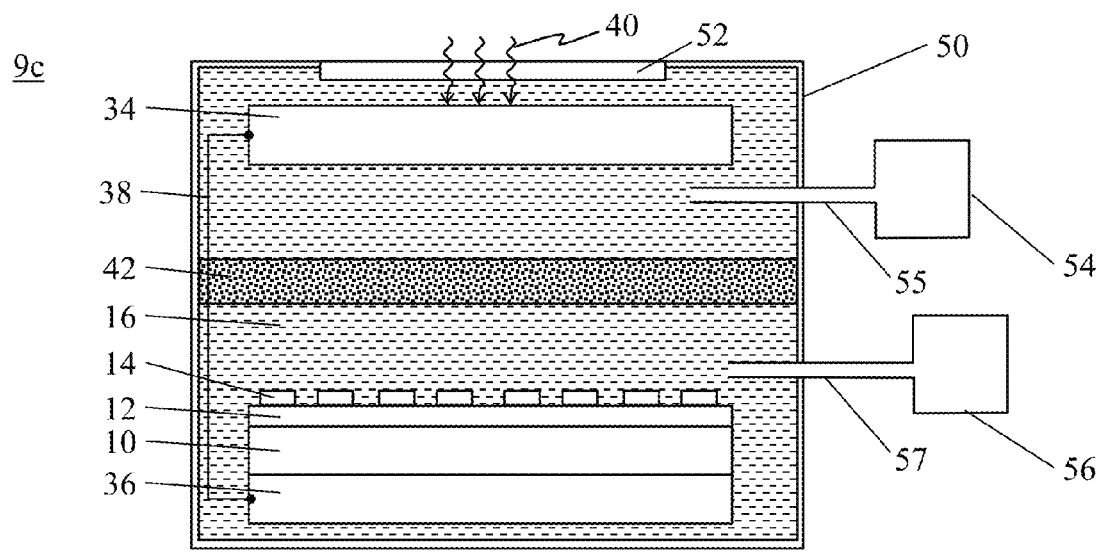
FIG. 10 shows a cross-section of photoelectrochemical article disposed in container and subjected to front illumination.
Figure 11:
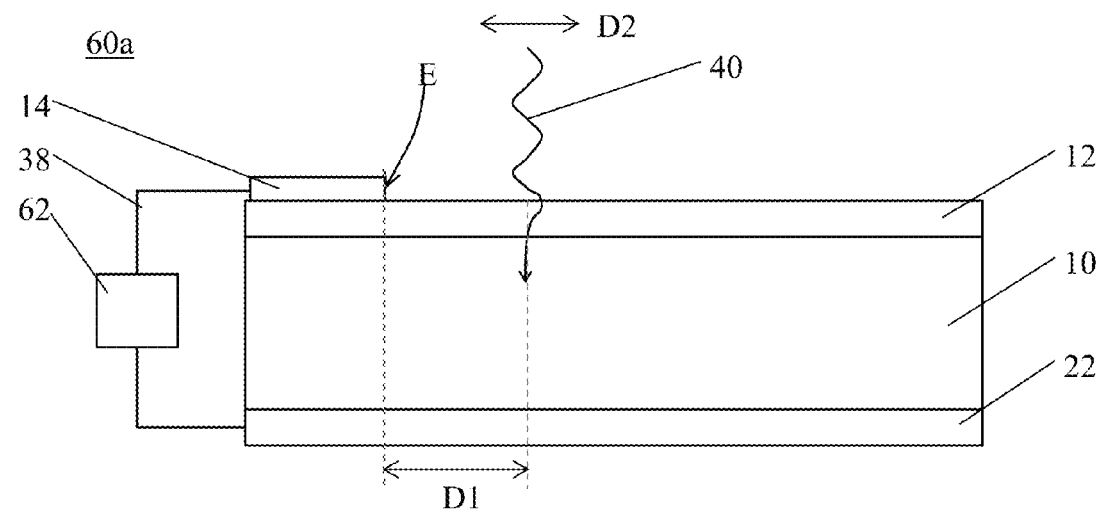
FIGS. 11, 12, 13, and 14 show cross-sections of a photosensitive article.

In an embodiment, as shown in FIG. 10, photoelectrochemical article 9c includes container 50 (e.g., a device encapsulation) that contains substrate 10, dielectric layer 12, conductive member 14, and electrode 34. Membrane 42 partitions electrolyte 16 and is interposed between conductive member 14 and electrode 34. Optic 40 is disposed in an opening of container 50 to transmit light 40 to substrate 10. Again, first and second electrochemical half-reactions respectively occur at electrode 34 and conductive member 14. Delivery member 54 connects to container 50 and transmits reactant R via conduit 55 into electrolyte 16 for contact with electrode 34. Receiver 56 (e.g. a storage vessel) receives, via conduit 57, final product F formed by contact of initial product P1 with conductive member 14. Delivery member 54 and receiver 56 can be independently a vessel or transfer line. Various equipment can be included with delivery member 54, receiver 56, or conduits 55, 57 such as a pressure gauge, valve, flow meter, thermal regulator, thermocouple, fluid pump, and the like.

With regard to substrate 10 and photovoltaic member 36, various combinations of semiconductor materials with different band gaps are contemplated, including, e.g., a narrow band gap substrate 10 with a wide band gap photovoltaic member 36 (e.g., in photoelectrochemical article 9a or 9b) or a wide band gap substrate 10 with a narrow band gap photovoltaic member 36, as in photoelectrochemical article 9c.

In some embodiments, the photoactive article is a position sensitive article 60a, 60b, 60c, 60d as shown respectively, e.g., in FIG. 11, 12, 13, or 14. Position sensitive article 60a includes substrate 10 having a dielectric layer 12 disposed thereon. Conductor 38 electrically connects conductive member 14 to metal contact 22 via probe 62 (e.g., an ammeter, voltmeter, temperature sensor, power meter, and the like). Probe 62 is configured to records a photovoltage or photocurrent from position sensitive article 60a, 60b, 60c, 60d. Light 40 impinges on dielectric layer 40 and can be positioned in direction D2 with respect to a location of where the light 40 impinges on dielectric layer 12. In this manner, an electrical signal (e.g., a potential difference) between conductive member 14 and metal contact 22 occurs and can be monitored by probe 62. A magnitude of the electrical signal is proportional to distance D1 between an incident position of light 40 on dielectric layer 12 and proximate portion (e.g., edge E) of conductive member 14. In an embodiment, the electrical signal is greatest when distance D1 is smallest and decreases as distance D1 increases. In this manner, the electrical signal is a function of a lateral position of light 40 with respect to conductive member 14.

Figure 12:
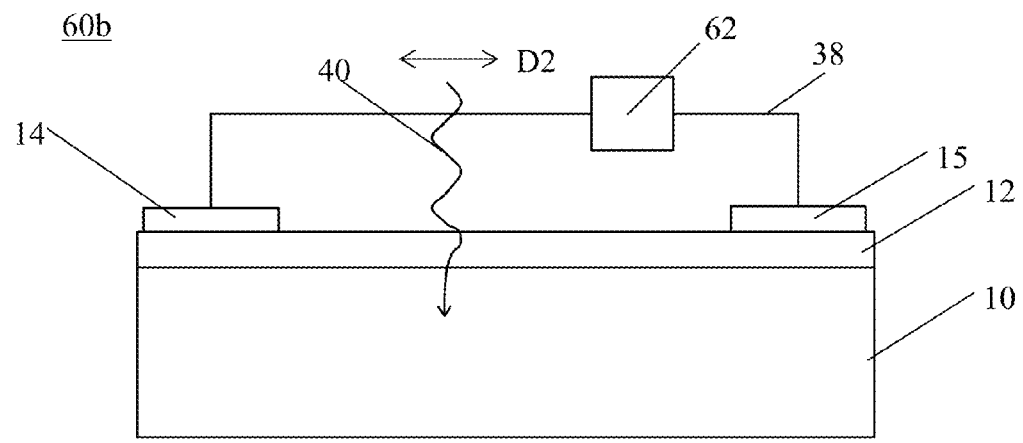
Figure 13:
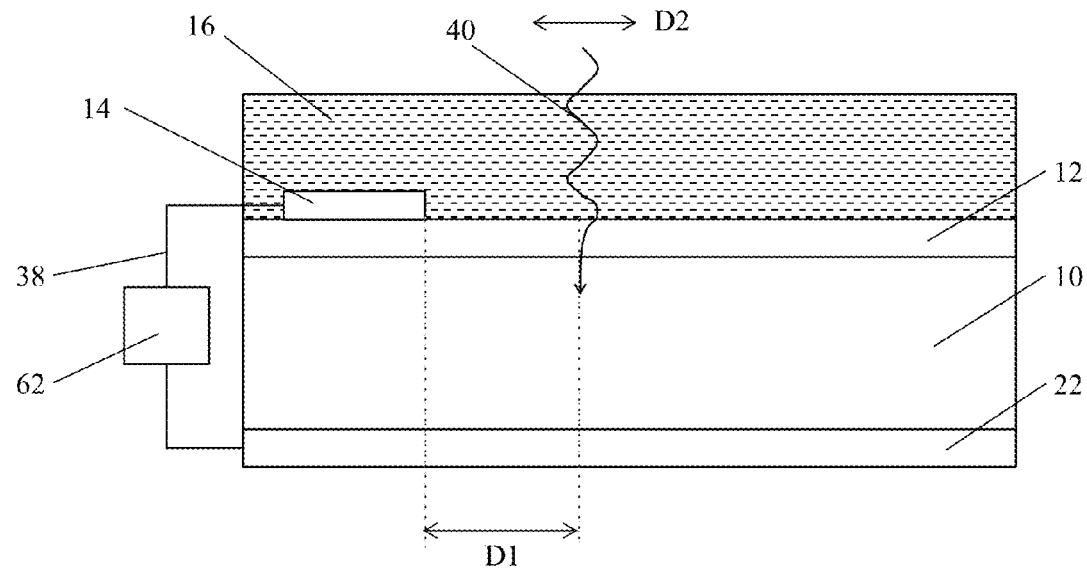
Figure 14:
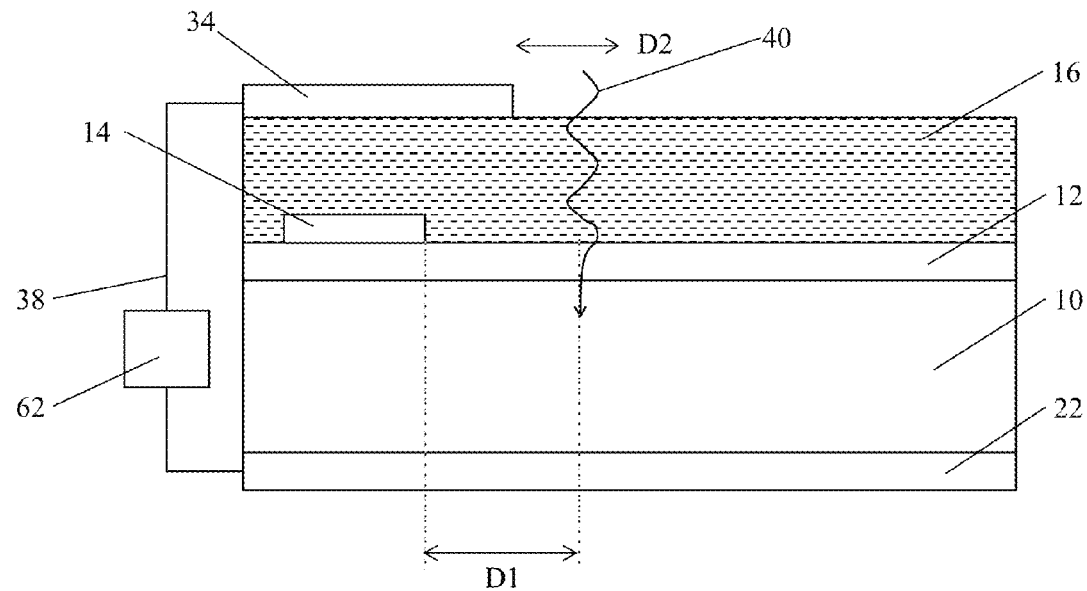

According to an embodiment, position sensitive detector 60b (FIG. 12) includes conductive member 14 spaced apart from conductive member 15, both of which are disposed on dielectric layer 12. Conductor 38 electrically connects conductive members 14, 15 via probe 62. An electrical signal occurs between conductive members 14, 15 in response to impingement of light 40 in substrate 10 such that a position of light 40 relative to conductive members 14, 15 determines an amplitude of the electrical signal therebetween. That is, as light 40 is moved laterally in a direction D2, the electrical signal changes. While the electrical signal traverses substrate 10 and conductive member 14 in position sensitive article 60a (FIG. 11), the electrical signal exists laterally in the substrate 10 for the position sensitive article 60b (FIG. 12).

In an embodiment, position sensitive article 60c (FIG. 13) includes electrolyte 16 disposed on conductive member 14 and dielectric layer 12. According to an embodiment electrolyte 16 directly contact conductive member 14 and dielectric layer 12. In some embodiments, electrolyte 16 does not directly contact conductive member 14 and dielectric layer 12. Probe 62 electrically interconnects conductive member 14 and metal contact 22 to measure an electrical signal therebetween created by light 40 absorbed by substrate 10, which creates charge carriers, e.g., electrons and holes. Again, an amplitude of the electrical signal is proportional to distance D1. Presence of electrolyte 16 mediates a number of characteristics of the electrical signal, e.g., linearity of the amplitude of the electrical signal with distance D1, magnitude of the electrical signal, and a length of distance D1 over which the magnitude of the electrical signal is above a noise level of the position sensitive article. In an embodiment, the characteristics of the electrical signal increase when electrolyte 16 is present as compared to absence of electrolyte 16.

According to an embodiment, position sensitive article 60d (FIG. 14) includes electrolyte 16 interposed between electrode 34 and conductive member 14. In this arrangement, first and second electrochemical half-reactions occur respectively on electrode 34 and conductive member 14. Additionally, probe 6 is electrically connected to the electrode 34 and metal contact 22 to measure an electrical signal therebetween. Again, substrate 10 absorbs light 40, and an amplitude of the electrical signal is proportional to distance D1. Presence of electrolyte 16 mediates a number of characteristics of the electrical signal, e.g., linearity of the amplitude of the electrical signal with distance D1, magnitude of the electrical signal, and a length of distance D1 over which the magnitude of the electrical signal is above a noise level of the position sensitive article. In an embodiment, the characteristics of the electrical signal increase when electrolyte 16 is present as compared to absence of electrolyte 16.

Figure 15:
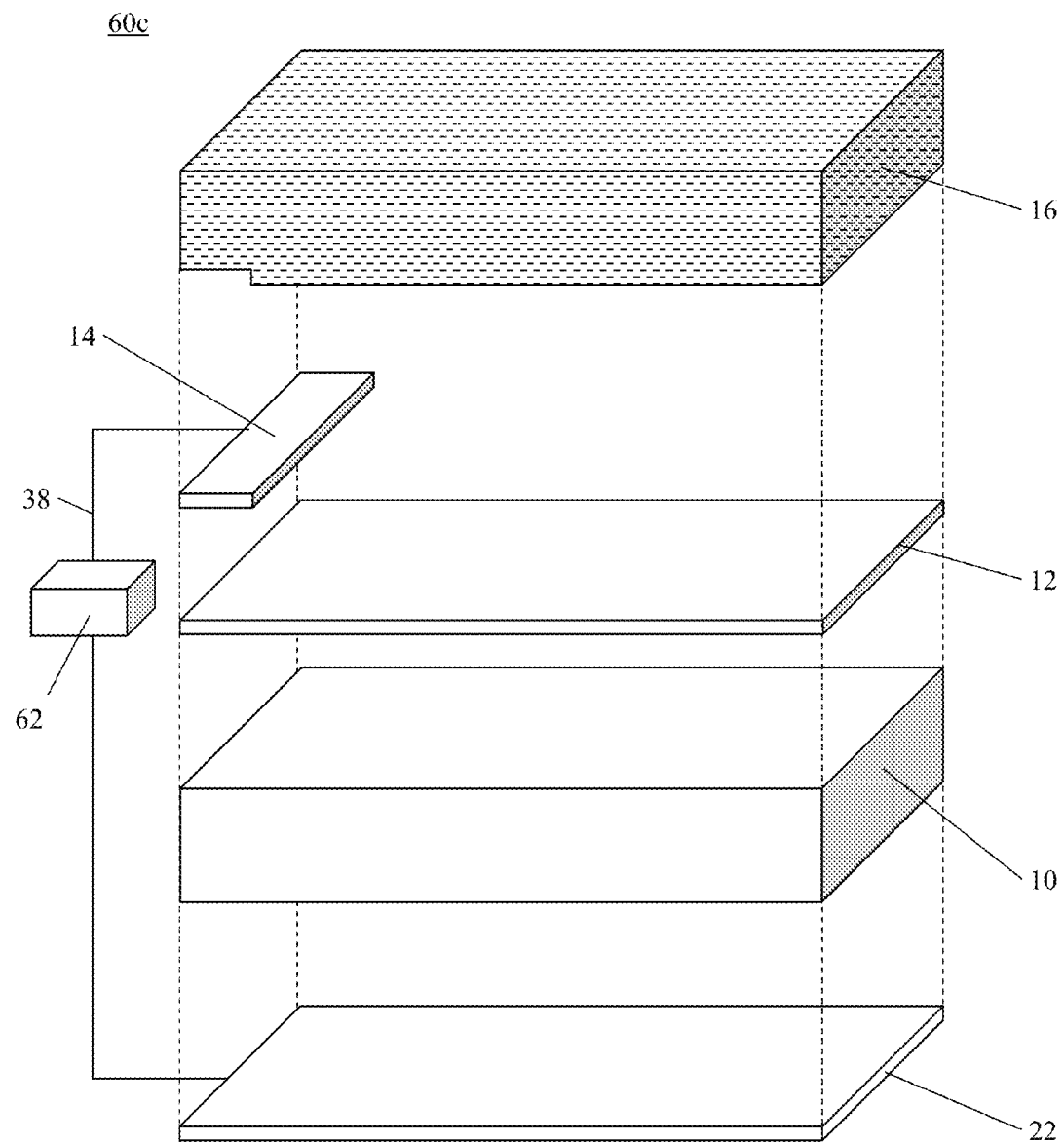
FIG. 15 shows an exploded view of a photosensitive article.

An exploded view of position sensitive article 60c is shown in FIG. 15. Here, conductive member 14 is a cuboid although it could be a parallelpiped, frustrum, and the like as well as any above-disclosed shape.

In an embodiment, the substrate includes a semiconductor. An exemplary semiconductor is an element from group 11, 12, 13, 14, 15, or 16 (IUPAC nomenclature, which respectively is identical to group I, II, III, IV, V, or VI) of the periodic table such as a Si, Ga, Ge, As, In, Sn, Sb, Te, At, Hf, Zn, and the like, or a combination thereof. According to an embodiment, the substrate is a compound semiconductor such as SiC, SiGe, GaN; a group 13-15 (also referred to as a group III-V) semiconductor such as AlSb, AlAs, AlN, AlP, BN, GaSb, GaAs, GaN, GaP, InSb, InAs, InN, InP, and the like; a group 12-16 (group II-VI) semiconductor such as CdSe, CdS, CdTe, ZnO, ZnSe, ZnS, ZnTe, and the like; a group 11-17 (group I-VII) semiconductor such as CuCl and the like; a group 14-16 (group IV-VI) semiconductor such as PbS, PbTe SnS, and the like; a layer semiconductor such as $PbI_2$, $MoS_2$, GaSe, and the like; an oxide semiconductor such as CuO, $Cu_2O$, and the like; (Al,Ga)N, (Al,Ga)As, (In,Ga)As, (Al,Ga)Sb, (In,Ga)Sb, as well as nitride, arsenide, antimonide quaternary III-V alloys, or a combination comprising at least one of the foregoing. Examples of II-VI alloys include, but are not limited to CdSe, CdTe, CdS, ZnSe, and combinations thereof. Examples of Group III-V ternary alloys include, but are not limited to, (Ga,Al)As, (In,Ga)As, and combinations thereof. Exemplary Group III-V quaternary alloys include (Ga,In)(As,P), (In,Al,Ga)Sb, and the like. Exemplary Group III-nitride alloys include (Ga,Al)N, (Ga,In)N, (Al,In)N, (Ga,Al,In)N, and combinations thereof. Quaternary alloys of the above may also be employed.

The substrate also can include a supplemental element such as C, H, N, Li, Na, K, Mg, Ca, Sr, Ba, Bi, B, Al, P, S, O, and the like in an amount typically less than an amount of the semiconductor. In an embodiment, the substrate includes silicon, and the silicon is optionally doped. According to an embodiment, the semiconductor is an intrinsic semiconductor or an extrinsic semiconductor doped with a selected dopant, e.g., a p-dopant or an n-dopant. In one embodiment, the substrate includes a p-dopant. In another embodiment, the substrate includes an n-dopant. In a particular embodiment, the substrate is p-doped Si. In one embodiment, the substrate is n-doped Si. The substrate can be produced from, e.g., commercially available semiconductor grade p-doped Si having a particular crystalline orientation, e.g., having Miller indices <111>, <100>, and the like. The substrate can be amorphous, polycrystalline, or a single crystal. In an embodiment, the substrate has a stacked structure that includes a plurality of semiconductor layers such as by forming films as SiGe/Si/SiGe/Si on the Si substrate. In some embodiments, the substrate includes crystalline domains among amorphous material. The substrate is selected to absorb light and create charge carriers, e.g., electrons and holes. The charge carriers have a high mobility in the substrate, and the substrate communicates either holes or electrons toward the conductive member, and the oppositely charged charge carrier away from the conductive member.

According to an embodiment, the dielectric layer is disposed on the substrate. The dielectric layer can include an oxide such as an oxide that includes an element from the substrate, e.g., an oxide of the semiconductor (also referred to herein as a semiconductor oxide). In an embodiment, the substrate includes Si, and the dielectric layer includes silicon dioxide ($SiO_2$). Other dielectric layer materials include gallium oxide ($GaO_3$), aluminum oxide ($Al_2O_3$), or alloys thereof, oxides of compounds from Groups III and V or alloys thereof, and the like. Exemplary oxides in the dielectric layer also include ZnO, $HfO_2$, $SnO_2$, $In_2O_3$, $Zn_2SnO_4$, $Ga_2O_3$, $Al_2O_3$, and the like. Without wishing to be bound by theory, it is believed that the dielectric layer communicates (e.g., by facilitating transport of) charge carriers between the substrate and the conductive member, e.g., by tunneling the charge carrier through the dielectric layer with high efficiency. In an embodiment, the dielectric layer is a product of oxidation of a portion of the substrate to produce the semiconductor oxide. According to one embodiment, the oxide is a product of rapid thermal oxidation (RTO) of the substrate (referred to herein as an "RTO oxide") so that the oxide (dielectric layer) is derived from the substrate. In another embodiment, the oxide is a product of low temperature oxidation (LTO) of the substrate to produce an oxide (referred to herein as an "LTO oxide) having different properties than the RTO oxide. In a further embodiment, the oxide is a product of depositing the oxide on the substrate, which may or may not involve oxidation of the substrate. In a certain embodiment, the dielectric layer includes RTO $SiO_2$ as the oxide, which is a product of rapid thermal oxidation of the substrate that includes Si. In some embodiments, the dielectric layer includes a semiconductor oxide, a ceramic (e.g., $ZrO_2$, $Al_2O_3$, SiC, $Si_3N_4$, BN, $BaTiO_3$, and the like), a glass, or a combination comprising at least one of foregoing.

The conductive member is disposed on the dielectric layer and includes a conductive material that has a high electrical conductivity and that efficiently communicates charge carriers with the substrate. Exemplary conductive materials include graphite, graphene, carbon fibers, metallic nanoparticles (e.g., carbon nanotubes that metallic-(n,m)-nanotubes), metal (e.g., the first metal or the second metal) and the like. An electrical conductivity of the conductive member is effective to conduction electrons to and from a reactive site of the conductive member with minimal ohmic conduction losses. The conductive material includes a transition metal, alkaline earth metal, alkali metal, rare earth metal, metal carbide, metal oxide, metal sulfide, non-metals (e.g., graphene, carbon nanotubes, carbon black, and the like), or a combination thereof. Exemplary metals include Zr, Hf, Ti, V, Cr, Mn, Fe, Co, Ni, Cu, Zn, Nb, Mo, Tc, Ru, Rh, Pd, Ag, Cd, Ta, W, Re, Os, Ir, Pt, Au, Li, Na, K, Be, Mg, Ca, Sr, Ba, Gd, and the like. The conductive material can be selected for its catalytic efficiency for producing hydrogen ($H_2$) or producing oxygen ($O_2$). Moreover, the first metal and second metal can be selected to have a high catalytic activity (e.g., catalyzing hydrogen production), a low work function relative to a band gap of the semiconductor of the substrate, or a combination thereof.

The metal contact disposed on the substrate can be a conductive material listed above for the conductive member or an optically transparent conductive metal, e.g., a metal oxide such as indium tin oxide. The metal contact receives charge carriers, e.g., holes or electrons from the substrate and can be an electrical contact pad for connection to other components such the electrode, probe, and the like. In an embodiment, the metal contact forms an ohmic contact or a diode-like contact.

According to an embodiment, the electrode is a transition metal, alkaline earth metal, alkali metal, rare earth metal, or a combination thereof. Exemplary metals include Zr, Hf, Ti, V, Cr, Mn, Fe, Co, Ni, Cu, Zn, Nb, Mo, Tc, Ru, Rh, Pd, Ag, Cd, Ta, W, Re, Os, Ir, Pt, Au, Li, Na, K, Be, Mg, Ca, Sr, Ba, Gd, and the like. The electrode can be selected for its catalytic efficiency for producing hydrogen ($H_2$) or producing oxygen ($O_2$) or its efficiency in promoting various electrochemical half-reactions.

As in embodiments described above, the electrolyte is disposed on the conductive member and the dielectric layer. The electrolyte includes a fluid, a solid, or a combination comprising at least one of the foregoing. The electrolyte communicates or includes neutral species or charged species (e.g., ions, polyions, zwitterions, and the like) that contact the conductive member, dielectric layer, or the electrode. It is contemplated that the electrolyte insulates the conductive member and dielectric layer from the electrode with respect to communication of electrons; i.e., the electrolyte can be selected to block the transmission of electrons therein while communicating other charged species such as cations, anions, or zwitterions as well as polar species (e.g., water). The neutral species or charged species contact the conductive member, dielectric layer, or electrode and are subjected to an electrochemical half-reaction as discussed previously with reference to FIG. 9. The fluid can be a gas or liquid, or an equilibrium combination thereof. The neutral or charged species can be introduced into the electrolyte or can be the electrolyte. Exemplary fluid electrolytes includes water, an acid (e.g., H2SO4, HNO3, H3PO4, and the like), an alcohol (e.g., methanol, ethanol, and the like), an ionic liquid, and the like.

In an embodiment, the electrolyte is a solid and includes a metal, polymer, colloidal particle, salt, and the like. Exemplary polymers include polyethylene oxides, polyimides, polyamine, N,N-dimethylacrylamide, perfluorianated polymers such Nafion, polyethers, polyphosphazines, polyacrylonitriles, polysiloxanes, polyether grafted polysiloxanes, divinyl polyethylene glycols, polyethylene glycol-bis-(methyl acrylates), polyethylene glycol-bis(methyl methacrylates), poly(3,4-ethylenedioxythiophene)-poly(styrenesulfonate), polyaniline-camphorsulfonic acid, pentacene, polyacetylene, poly(3-hexylthiophene), polysiloxane carbazole, polyaniline, polyethylene oxide, polyindole, polycarbazole, polypyridazine, polyisothianaphthalene, polyphenylene sulfide, polyvinylpyridine, polythiophene, polyfluorene, polypyridine, polypyrrole, polysulfur nitride, derivatives thereof, copolymers thereof, cross-linked or network structures thereof, blends thereof, and the like.

Exemplary neutral species include water, alcohols, insoluble inorganic salts, biomass-derived organic compounds, and the like.

Exemplary charged species include protons, hydroxide, alkali metal cations, halogen anions, carbonates, alcoholates, sulfonates, sulfates, phosphates, phosphonates, $BF_4^-$, $PF_6^-$, $(CF_3SO_2)_2N^-$, $CF_3SO_3^-$, $CF_3CO_2^-$, $AsF_6^-$, $SbF_6^-$, $AlCl_4^-$, $NbF_6^-$, $HSO_4^-$, $ClO_4^-$, $CH_3SO_3^-$, $CF_3SO_3^-$, $(CF_3SO_2)_2N^-$, $Cr^-$, N-methylpyrrolidiinum, pyrrolidinium, 1-ethylimidazolium, 1-ethyl-3-methylimidazolium, 2-methyl-1-pyrrolinium, N-butylpyridinium, and the like. Further exemplary charged species include pyrophosphates, hexametaphosphates, ethylenediaminetetraacetates, N-(2-hydroxyethyl)-ethylenediaminetriacetates, nitrilotriacetates, N-(2-hydroxyethyl)-nitrilodiacetates, phytates, ethane-1-hydroxy-1,1-diphosphonates, methylene diphosphonates, ethylidene, isopropylidene, benzylmethylidene and chloromethylidene diphosphonates, salts of polymers of itaconic acid, aconitic acid, maleic acid, mesaconic acid, fumaric acid, methylene malonic acid and citraconic acid and copolymers with themselves and ethylene, and mixtures thereof. Exemplary cations of the polyelectrolytes include sodium, potassium, ammonium, triethanol ammonium, diethanol ammonium and monoethanol ammonium cations, and the like.

Exemplary ionic liquids include imidazolium salts with oligo(ethylene glycol) groups such as 1-ethyl-3-((2-methoxyethoxy)methyl)-1H-imidazol-3-ium bis(trifluoromethanesulfonyl)imide; 1-ethyl-3-((2-(2-methoxyethoxy)ethoxy)methyl)-1H-imidazol-3-ium bis(trifluoromethanesulfonyl)imide; 3-2,5,8,11-tetraoxadodecyl-1-ethyl-1H-imidazol-3-ium bis(trifluoromethanesulfonyl) imide; 1-ethyl-3-((2-methoxyethoxy)methyl)-1H-imidazol-3-ium bis(fluoromethanesulfonyl)imide; 1-ethyl-3-((2-(2-methoxyethoxy)ethoxy)methyl)-1H-imidazol-3-ium bis (fluoromethanesulfonyl)imide; 3-2,5,8,11-tetraoxadodecyl-1-ethyl-1H-imidazol-3-ium bis(fluoromethanesulfonyl)imide; 1-ethyl-3-((2-methoxyethoxy)methyl)-1H-imidazol-3-ium bis(oxalato)borate; 1-ethyl-3-((2-(2-methoxyethoxy)ethoxy)methyl)-1H-imidazol-3-ium bis(oxalato)borate; 3-2,5,8,11-tetraoxadodecyl-1-ethyl-1H-imidazol-3-ium bis(oxalato)borate; 1-ethyl-3-((2-methoxyethoxy)methyl)-1H-imidazol-3-ium hexafluorophosphate; 1-ethyl-3-((2-(2-methoxyethoxy)ethoxy)methyl)-1H-imidazol-3-ium hexafluorophosphate, 3-2,5,8,11-tetraoxadodecyl-1-ethyl-1H-imidazol-3-ium hexafluorophosphate, and the like.

Further exemplary ionic liquids include imidazolium salts with siloxane groups such as 1-ethyl-3-(methylenepentamethyldisiloxane)-1H-imidazol-3-ium bis(trifluoromethanesulfonyl)imide; 1-ethyl-3-(methyleneheptamethyltrisiloxane)-1H-imidazol-3-ium bis(trifluoromethanesulfonyl)imide; 1-ethyl-3-(methyleneoctamethyltetrasiloxane)-1H-imidazol-3-ium bis(trifluoromethanesulfonyl)imide; 1-ethyl-3-(methylenepentamethyldisiloxane)-1H-imidazol-3-ium bis(oxalato)borate; 1-ethyl-3-(methyleneheptamethyltrisiloxane)-1H-imidazol-3-ium bis(oxalato)borate; 1-ethyl-3-(methyleneoctamethyltetrasiloxane)-1H-imidazol-3-ium bis(oxalato)borate; 1-ethyl-3-(methylenepentamethyldisiloxane)-1H-imidazol-3-ium bis(fluoromethanesulfonyl)imide; 1-ethyl-3-(methyleneheptamethyltrisiloxane)-1H-imidazol-3-ium bis(fluoromethanesulfonyl)imide; 1-ethyl-3-(methyleneoctamethyltetrasiloxane)-1H-imidazol-3-ium bis(fluoromethanesulfonyl)imide; 1-ethyl-3-(methylenepentamethyldisiloxane)-1H-imidazol-3-ium hexafluorophosphate; 1-ethyl-3-(methyleneheptamethyltrisiloxane)-1H-imidazol-3-ium hexafluorophosphate; 1-ethyl-3-(methyleneoctamethyltetrasiloxane)-1H-imidazol-3-ium hexafluorophosphate, and the like.

Exemplary ionic liquids include but are not limited to imidazolium salts with sulfone groups such as 1-ethyl-3-(2-(methylsulfonyl)ethyl)-1H-imidazol-3-ium bis(trifluoromethanesulfonyl)imide; 1-ethyl-3-(2-(ethylsulfonyl)ethyl)-1H-imidazol-3-ium bis(trifluoromethanesulfonyl)imide; 1-ethyl-3-(2-(propylsulfonyl)ethyl)-1H-imidazol-3-ium bis(trifluoromethanesulfonyl)imide; 1-ethyl-3-(2-(butylsulfonyl)ethyl)-1H-imidazol-3-ium bis(trifluoromethanesulfonyl)imide; 1-ethyl-3-(2-(methylsulfonyl)ethyl)-1H-imidazol-3-ium bis(oxalato)borate; 1-ethyl-3-(2-(ethylsulfonyl)ethyl)-1H-imidazol-3-ium bis(oxalato)borate; 1-ethyl-3-(2-(propylsulfonyl)ethyl)-1H-imidazol-3-ium bis(oxalato)borate; 1-ethyl-3-(2-(butylsulfonyl)ethyl)-1H-imidazol-3-ium bis(oxalato)borate; 1-ethyl-3-(2-(methylsulfonyl)ethyl)-1H-imidazol-3-ium bis(fluoromethanesulfonyl)imide; 1-ethyl-3-(2-(ethylsulfonyl)ethyl)-1H-imidazol-3-ium bis(fluoromethanesulfonyl)imide; 1-ethyl-3-(2-(propylsulfonyl)ethyl)-1H-imidazol-3-ium bis(fluoromethanesulfonyl)imide; 1-ethyl-3-(2-(butylsulfonyl)ethyl)-1H-imidazol-3-ium bis(fluoromethanesulfonyl)imide; 1-ethyl-3-(2-(methylsulfonyl)ethyl)-1H-imidazol-3-ium hexafluorophosphate; 1-ethyl-3-(2-(ethylsulfonyl)ethyl)-1H-imidazol-3-ium hexafluorophosphate; 1-ethyl-3-(2-(propylsulfonyl)ethyl)-1H-imidazol-3-ium hexafluorophosphate; 1-ethyl-3(2-(butylsulfonyl)ethyl)-1H-imidazol-3-ium hexikluorophosphate, and the like.

Exemplary ionic liquids also include imidazolium salts with carbonate groups such as 1-ethyl-3-((2-oxo-1,3-dioxolan-4-yl)methyl)-1H-imidazol-3-ium bis(trifluoromethanesulfonyl)imide; 1-ethyl-3-((2-oxo-1,3-dioxolan-4-yl)ethyl)-1H-imidazol-3-ium bis(trifluoromethanesulfonyl)imide; 1-ethyl-3-((2-oxo-1,3-dioxolan-4-yl)propyl)-1H-imidazol-3-ium bis(trifluoromethanesulfonyl)imide; 1-ethyl-3-((2-oxo-1,3-dioxolan-4-yl)methyl)-1H-imidazol-3-ium bis(oxalato)borate; 1-ethyl-3-((2-oxo-1,3-dioxolan-4-yl)ethyl)-1H-imidazol-3-ium bis(oxalato)borate; 1-ethyl-3-((2-oxo-1,3-dioxolan-4-yl)propyl)-1H-imidazol-3-ium bis(oxalato)borate; 1-ethyl-3-((2-oxo-1,3-dioxolan-4-yl)methyl)-1H-imidazol-3-ium bis(fluoromethanesulfonyl)imide; 1-ethyl-3-((2-oxo-1,3-dioxolan-4-yl)ethyl)-1H-imidazol-3-ium bis(fluoromethanesulfonyl)imide; 1-ethyl-3-((2-oxo-1,3-dioxolan-4-yl)propyl)-1H-imidazol-3-ium bis(fluoromethanesulfonyl)imide; 1-ethyl-3-((2-oxo-1,3-dioxolan-4-yl)methyl)-1H-imidazol-3-ium hexafluorophosphate; 1-ethyl-3-((2-oxo-1,3-dioxolan-4-yl)ethyl)-1H-imidazol-3-ium hexafluorophosphate; 1-ethyl-3-((2-oxo-1,3-dioxolan-4-yl)propyl)-1H-imidazol-3-ium hexafluorophosphate, and the like.

Exemplary ionic liquids include but are not limited to phosphonium salts with oligo(ethylene glycol) groups such as triethyl((2-methoxyethoxy)methyl)phosphonium bis(trifluoromethylsulfonyl)imide; triethyl((2-(2-methoxyethoxy)ethoxy)methyl)phosphonium bis(trifluoromethylsulfonyl)imide; triethyl((2-(2-(2-methoxyethoxy)ethoxy)ethoxy)methyl)phosphonium bis(trifluoromethylsulfonyl)imide; triethyl((2-methoxyethoxy)methyl)phosphonium bis(fluoromethylsulfonyl)imide; triethyl((2-(2-methoxyethoxy)ethoxy)methyl)phosphonium bis(fluoromethylsulfonyl)imide; triethyl((2-(2-(2-methoxyethoxy)ethoxy)ethoxy)methyl)phosphonium bis(fluoromethylsulfonyl)imide; triethyl((2-methoxyethoxy)methyl)phosphonium bis(oxalato)borate; triethyl((2-(2-methoxyethoxy)ethoxy)methyl)phosphonium bis(oxalato)borate; triethyl((2-(2-(2-methoxyethoxy)ethoxy)ethoxy)methyl)phosphonium bis(oxalato)borate; triethyl((2-methoxyethoxy)methyl)phosphonium hexafluorophosphate; triethyl((2-(2-methoxyethoxy)ethoxy)methyl)phosphonium hexafluorophosphate; triethyl((2-(2-(2-methoxyethoxy)ethoxy)ethoxy)methyl)phosphonium hexafluorophosphate, and the like.

Exemplary ionic liquids further include phosphonium salts with siloxane groups such as triethyl-(methylenepentamethyldisiloxane)phosphonium bis(trifluoromethylsulfonyl)imide; triethyl-(methyleneheptamethyltrisiloxane)phosphonium bis(trifluoromethylsulfonyl)imide; triethyl-(methyleneoctamethyltetrasiloxane)phosphonium bis(trifluoromethylsulfonyl)imide; triethyl-(methylenepentamethyldisiloxane)phosphonium bis(fluoromethylsulfonyl)imide; triethyl-(methyleneheptamethyltrisiloxane)phosphonium bis(fluoromethylsulfonyl)imide; triethyl-(methyleneoctamethyltetrasiloxane)phosphonium bis(fluoromethylsulfonyl)imide; triethyl-(methylenepentamethyldisiloxane)phosphonium bis(oxalato)borate; triethyl-(methyleneheptamethyltrisiloxane)phosphonium bis(oxalato)borate; triethyl-(methyleneoctamethyltetrasiloxane)phosphonium bis(oxalato)borate; triethyl-(methylenepentamethyldisiloxane)phosphonium hexafluorophosphate; triethyl-(methyleneheptamethyltrisiloxane)phosphonium hexafluorophosphate; triethyl-(methyleneoctamethyltetrasiloxane)phosphonium hexafluorophosphate, and the like.

Exemplary ionic liquids include but are not limited to phosphonium salts with sulfone groups such as triethyl-(2-(methylsulfonyl)ethyl)phosphonium bis(trifluoromethylsulfonyl)imide; triethyl-(2-(ethylsulfonyl)ethyl)phosphonium bis(trifluoromethylsulfonyl)imide; triethyl-(2-(propylsulfonyl)ethyl)phosphonium bis(trifluoromethylsulfonyl)imide; triethyl-(2-(butylsulfonyl)ethyl)phosphonium bis(trifluoromethylsulfonyl)imide; triethyl-(2-(methylsulfonyl)ethyl)phosphonium bis(fluoromethylsulfonyl)imide; triethyl-(2-

(ethylsulfonyl)ethyl)phosphonium bis(fluoromethylsulfonyl)imide; triethyl-(2-(propylsulfonyl)ethyl)phosphonium bis(fluoromethylsulfonyl)imide; triethyl-(2-(butylsulfonyl)ethyl)phosphonium bis(fluoromethylsulfonyl)imide; triethyl-(2-(methylsulfonyl)ethyl)phosphonium bis(oxalato)borate; triethyl-(2-(ethylsulfonyl)ethyl)phosphonium bis(oxalato)borate; triethyl-(2-(propylsulfonyl)ethyl)phosphonium bis(oxalato)borate; triethyl-(2-(butylsulfonyl)ethyl)phosphonium bis(oxalato)borate; triethyl-(2-(methylsulfonyl)ethyl)phosphonium hexafluorophosphate; triethyl-(2-(ethylsulfonyl)ethyl)phosphonium hexafluorophosphate; triethyl-(2-(propylsulfonyl)ethyl)phosphonium hexafluorophosphate; triethyl-(2-(butylsulfonyl)ethyl)phosphonium hexafluorophosphate, and the like.

Additional exemplary ionic liquids include phosphonium salts with carbonate groups such as triethyl-3-((2-oxo-1,3-dioxolan-4-yl)methyl)phosphonium bis(trifluoromethylsulfonyl)imide; triethyl-3-((2-oxo-1,3-dioxolan-4-yl)ethyl)phosphonium bis(trifluoromethylsulfonyl)imide; triethyl-3-((2-oxo-1,3-dioxolan-4-yl)propyl)phosphonium bis(trifluoromethylsulfonyl)imide; triethyl-3-((2-oxo-1,3-dioxolan-4-yl)methyl)phosphonium bis(fluoromethylsulfonyl)imide; triethyl-3-((2-oxo-1,3-dioxolan-4-yl)ethyl)phosphonium bis(fluoromethylsulfonyl)imide; triethyl-3-((2-oxo-1,3-dioxolan-4-yl)propyl)phosphonium bis(fluoromethylsulfonyl)imide; triethyl-3-((2-oxo-1,3-dioxolan-4-yl)methyl)phosphonium bis(oxalato)borate; triethyl-3-((2-oxo-1,3-dioxolan-4-yl)ethyl)phosphonium bis(oxalato)borate; triethyl-3-((2-oxo-1,3-dioxolan-4-yl)propyl)phosphonium bis(oxalato)borate; triethyl-3-((2-oxo-1,3-dioxolan-4-yl)methyl)phosphonium hexafluorophosphate; triethyl-3-((2-oxo-1,3-dioxolan-4-yl)ethyl)phosphonium hexafluorophosphate; triethyl-3-((2-oxo-1,3-dioxolan-4-yl)propyl)phosphonium hexafluorophosphate, and the like.

In an embodiment, the electrolyte includes a solvent, e.g., cyclic carbonic acid esters, linear carbonic acid esters, phosphoric acid esters, oligoether substituted siloxanes/silanes, cyclic ethers, chain ethers, lactone compounds, chain esters, nitrile compounds, amide compounds, sulfone compounds, dimethyl carbonate, ethyl methyl carbonate, diethyl carbonate, methyl propyl carbonate, ethyl propyl carbonate, dipropyl carbonate, bis(trifluoroethyl) carbonate, bis(pentafluoropropyl) carbonate, trifluoroethyl methyl carbonate, pentafluoroethyl methyl carbonate, heptafluoropropyl methyl carbonate, perfluorobutyl methyl carbonate, trifluoroethyl ethyl carbonate, pentafluoroethyl ethyl carbonate, heptafluoropropyl ethyl carbonate, perfluorobutyl ethyl carbonate, fluorinated oligomers, dimethoxyethane, triglyme, dimethylvinylene carbonate, tetraethyleneglycol, dimethyl ether, polyethylene glycols, sulfones, gamma-butyrolactone, ethylene carbonate, diethyl carbonate, polypropylene carbonate, sulfolane, dimethylsulfoxide, acetonitrile, tetrahydrofuran, or a combination thereof.

In an embodiment, the electrolyte includes a lithium salt, e.g., lithium paratoluene sulfonate, lithium trifluoromethanesulfonate, LiCl, LiClO$_4$, LiBF$_4$, LiPF$_6$, LiAsF$_6$, LiCF$_3$SO$_3$, LiN(CF$_3$SO$_2$)$_2$, LiC(CF$_3$SO$_2$)$_3$, LiCF$_3$CO$_2$, LiC$_2$F$_5$CO$_2$, LiPF$_2$(C$_2$O$_4$)$_2$, LiPF$_4$C$_2$O$_4$, LiN(CP$_3$SO$_2$)$_2$, LiN(SO$_2$C$_2$F$_5$)$_2$, lithium alkyl fluorophosphates, LiB(C$_2$O$_4$)$_2$, LiBF$_2$C$_2$O$_4$, and the like.

In certain embodiments, the electrolyte includes a gel electrolyte. Exemplary gel electrolytes include polymer gel electrolytes such as an electrolyte containing polyvinylidenefluoride-co-polyhexafluoropropylene, polyacrylonitrile, polyethylene oxide, polyalkylacrylate, and the like. An ionic gel electrolyte can include inorganic particles such as silica nanoparticles, titanium dioxide nanoparticles, and the like.

According to an embodiment, the electrolyte is the solid electrolyte that includes a perfluorosulfonate ionomer (e.g., NAFION, commercially available from Dupont under the trademark NAFION 117, from DOW under the trademark XUS-1304, and the like). NAFION has a polytetrafluoroethylene (PTFE) like backbone with perfluorocarbon sulfonate side chains to facilitate ion transport across the ionomer. Other examples of solid electrolytes can be found in *Proton Conductors, Solid, Membranes and Gels*, ed. by Philippe Colomban, (Cambridge University Press, 1992), the disclosure of which is incorporated herein in its entirety.

In an embodiment, the electrolyte is a species that is subjected to disproportion in the photoactive article such as the photoelectrochemical article. Referring again to FIG. 9, the electrolyte can be reactant R (e.g., water) that contacts electrode 34 to produce initial product P1 (H$^+$) and initial product P2 (O$_2$). Membrane 42 selectively communicates H$^+$ to conductive member 14. Final product F (H$_2$) is formed via contact of initial product P1 (H$^+$) with conductive member 14 or dielectric layer 12. In this manner, photoelectrochemical article 9b generates H$_2$ from H$_2$O in response to absorption of light 40 by substrate 10.

The substrate can be various thicknesses or widths. A thickness of the substrate is from 10 nanometers (nm) to 1 millimeters (mm), specifically 10 nm to 1000 micrometers (μm), and more specifically 10 nm to 1,000,000 nm. The width of the substrate can be from 100 micrometers (μm) to 50 meters (m). It is contemplated that the substrate can be planar or have other shapes such as a curved shape include circular, toroidal, convex, concave, and the like shapes.

The dielectric layer can be various thicknesses or widths. A thickness of the dielectric layer is from 1 nanometers (nm) to 100 nm. The width and length of the dielectric layer will mirror that of the substrate. In an embodiment, the thickness of the dielectric layer is selected to communicate efficiently charged species (e.g., electrons) between the substrate and the conductive member.

The conductive member can have a thickness from 0.1 nanometers (nm) to 1 millimeters (mm), specifically 0.1 nm to 1000 micrometers (μm), and more specifically 0.1 nm to 1 mm. The width of the conductive member can be from 1 nanometers (nm) to 1 meter (m). In the case of a plurality of conductive members disposed on the dielectric layer, a first portion of the conductive members can have a different size than a second portion of the conductive members. Further, a distance between the neighboring conductive members can be from_nanometers (nm) to_millimeters (mm), specifically_nm to_micrometers (μm), and more specifically_nm to_nm.

The electrode can have a thickness from 0.1 nanometers (nm) to 100 millimeters (mm). The width of the electrode can be substantially similar to the conductive member.

The metal contact can have a size that is substantially the same as the substrate or different. The metal contact can cover a portion of substrate or substantially all of a surface of the substrate. The metal contact can have a thickness from_nanometers (nm) to_millimeters (mm), specifically_nm to_micrometers (μm), and more specifically_nm to_nm. The width of the metal contact can be from_nanometers (nm) to_millimeters (mm), specifically_nm to_micrometers (μm), and more specifically_nm to_nm.

In an embodiment, the substrate includes a dopant, e.g., an electron acceptor—(such as Boron) or an electron donor (such as phosphorous). An amount of the dopant is from $10^{12}$ dopant atoms cm$^{-3}$ to $10^{18}$ dopant atoms cm$^{-3}$, more specifically from $10^{14}$ dopant atoms cm$^{-3}$ to $10^{17}$ dopant atoms cm$^{-3}$.

The photoactive article can be made in various ways. According to an embodiment, as shown in FIGS. 16A-16G, substrate 10 is provided and subjected to cleaning. Substrate 10 can be a silicon wafer that is subjected to a cleaning procedure that includes removing organic contaminants, metallic contaminants, or native oxides. Substrate 10 is disposed in, e.g., a composition of NH$_4$OH, H$_2$O$_2$, and H$_2$O at an elevated temperature (e.g., 80° C.) for a fraction of an hour. Subsequently, substrate 10 is rinsed with distilled, de-ionized water and immersed in a composition containing HF and H$_2$O at a low temperature, e.g., 25° C., to remove oxide layers or ionic contaminants. Substrate 10 is removed from the HF composition and immersed in another composition that includes HCl, H$_2$O$_2$, and H$_2$O at an elevated temperature (e.g., 80° C.) so that substrate 10 is rendered substantially free of contaminants or native oxides. As a result, native oxide is substantially absent from substrate 10.

Figure 16A:
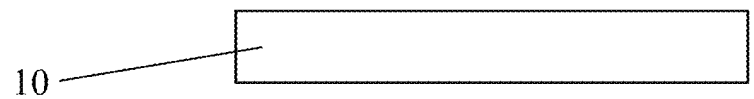
FIGS. 16A-16G show a process for making a photoactive article.
Figure 16B:
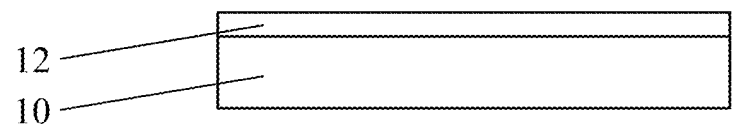

As shown in FIG. 16B, in an embodiment, dielectric layer 12 is disposed on substrate 10 by rapid thermal oxidation (RTO) of a semiconductor (e.g., Si) disposed in substrate 10. Here, substrate 10 was exposed to an oxidizing atmosphere that includes oxygen (e.g., a combination of O$_2$ and N$_2$), heated to a high temperature (e.g., a temperature greater than 700° C. or a temperature great enough to anneal substrate 10). Heating to the high temperature is performed from 5 seconds to 100 seconds, specifically 5 seconds to 20, and more specifically 5 seconds to 10 seconds to form dielectric layer 12. In this manner, although substrate 10 does not have a native oxide disposed thereon, dielectric layer 12 is disposed on substrate 10 and is formed from substrate 10 via RTO, the oxide being referred to as an RTO oxide. In an embodiment, the RTO oxide is RTO SiO$_2$.

Thereafter, dielectric layer 12 optionally is subjected to passivation by exposing dielectric layer 12 to a reducing atmosphere such as H$_2$ or a forming gas, e.g., a combination of H$_2$ and N$_2$, at an elevated temperature (e.g., from 300° C. to 500° C.) for a time, e.g., from 5 minutes to 1 hour. Without wishing to be bound by theory, it is believed that passivation diminishes dangling bonds at a surface of the dielectric layer.

Figure 16C:
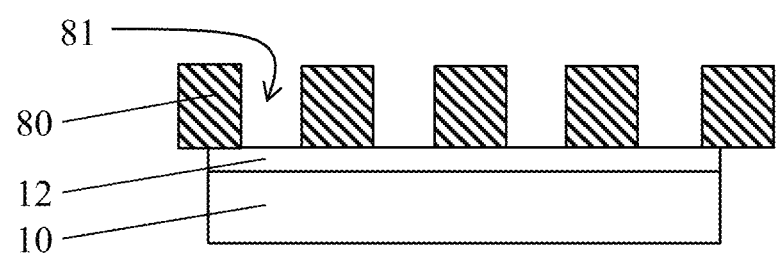
Figure 16D:
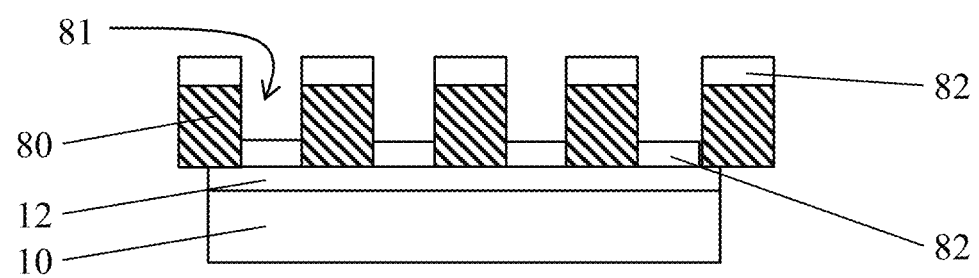
Figure 16E:
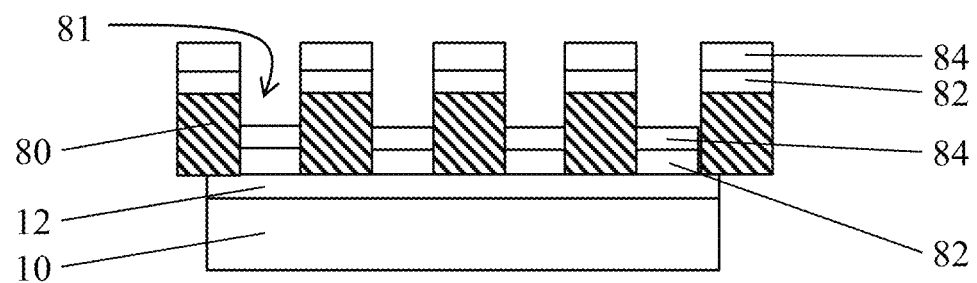
Figure 16F:
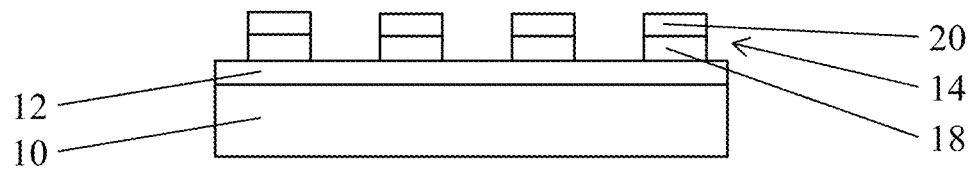
Figure 16G:
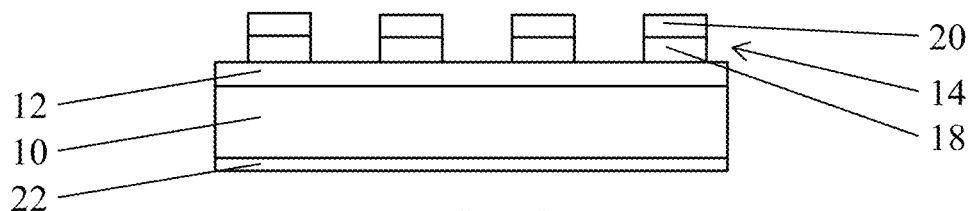

A mask 80 is disposed on dielectric layer 12 as shown in FIG. 16C. The mask includes a plurality of openings 81 that expose dielectric layer 12. With reference to FIGS. 16D and 16E, primary metal 82 is disposed on mask 80 and dielectric layer 12 followed by disposing secondary metal 84 on primary metal 82. Primary metal 82 and secondary metal 84 can be produced by, e.g., evaporating metal from a metal target, such as a first metal target (for primary metal 82) or a second metal target (for secondary metal 84). As shown in FIG. 16F, conductive member 14 is formed by removing mask 80 from dielectric layer 12 such that a portion of primary metal 82 and secondary metal 84 that were formerly disposed in openings 81 remain disposed on dielectric layer 12 respectively as first metal 18 and second metal 20. Metal contact 22 is disposed on substrate 10 by condensing a metal on substrate 10 as shown in FIG. 16G. Alternatively, metal contact 22 can be disposed by adhering metal contact 22 to substrate 10, e.g., by solder, conductive adhesive, and the like.

In an embodiment, a component (e.g., the conductive member, substrate, dielectric layer, metal contact, electrode, and the like) of the photoactive article can be disposed in various ways, including plasma deposition, electrodeposition, sputter deposition, cathodic arc deposition, evaporation, e-beam evaporation, chemical vapor deposition, atomic layer deposition, physical vapor deposition, electrochemical deposition, spin coating, spray coating, doctor blade coating, screen printing, or a combination thereof. In some embodiments, the component is formed by patterning such as nanosphere lithography, stamping, and the like.

According to an embodiment, a process for making a photoactive article includes forming a dielectric layer on a substrate comprising a semiconductor by rapid thermal oxidation of the semiconductor, the dielectric layer including an oxide of the semiconductor; disposing a mask on the dielectric layer such that a portion of the dielectric layer is exposed by the mask; disposing a primary metal on the mask and the portion of the dielectric layer that is exposed by the mask; and forming a conductive member disposed on the dielectric layer by removing the mask from the dielectric layer to form the photoactive article. The process further includes disposing an electrolyte comprising a reactant on the dielectric layer and the conductive member. Additionally, the photoactive article is subjected to making hydrogen by forming a plurality of protons from the reactant; absorbing light by the substrate; and electrochemically forming hydrogen from the protons on the conductive member.

In an embodiment, an electrochemical reaction proceeds by illuminating the photoelectrochemical article, including an electrolyte that has, e.g., 0.5 molar H$_2$SO$_4$. As shown in FIG. 10, for H$_2$ and O$_2$ evolution reactions, O$_2$ is evolved at electrode 34 while H$_2$ is evolved at conductive member 14.

Without wishing to be bound by theory, it is believed that light is absorbed by the semiconductor in the substrate, creating a plurality charge carriers such as a plurality of hole (h$^+$) and electron (e$^-$) pairs. The holes and electrons are mobile in the substrate and move in opposite directions, depending on a direction of an electric field across the photoactive article. In one embodiment, electrons move toward the conductive member, and holes move away from the conductive member and dielectric layer and move toward the metal contact. In another embodiment, holes move toward the conductive member, and electrons move away from the conductive member and dielectric layer and move toward the metal contact. According to an embodiment, at an interface of the conductive member and the electrolyte, electrons are involved in an electrochemical half-reaction, e.g., reducing protons to H2.

The photoactive article has numerous advantages. The photoactive article is stable and robust and its performance or structure is maintained over a wide array of environmental stresses including temperature (e.g., a cryogenic temperature or elevated temperature such as 800° C.), pH, photo degradation, electrical damage (such as from high currents or voltages), or time. Moreover, the photoactive article is constructed from readily available materials (e.g., commercially available Si wafers) and has low interfacial defects at an interface of the substrate and dielectric layer (e.g., a Si—SiO2 interface). Additionally, the photoactive article exhibits high photo conversion and electrochemical product formation.

The dielectric layer having the RTO oxide beneficially provides a high level of stability for the photoactive device and is a barrier that keeps chemicals or other contaminants from contacting the substrate, including the electrolyte, reactant, initial product, final product, and the like. Further, the dielectric layer is relatively defect-free such that pinholes, dislocations, and other blemishes are substantially absent from the dielectric layer. Additionally, the interface between the substrate and the dielectric layer has a low defect number density so that recombination of charge carriers is minimized, and a diffusion path length of charge carriers in the substrate is enhanced relative to a dielectric layer having an LTO oxide. Furthermore, the dielectric layers is a barrier against dopant diffusion from the substrate to the electrolyte or conductive member. This RTO oxide has far fewer dangling bonds as compared to a native oxide and therefore has an increased stability as compared to LTO oxides. In forming the conductive member on the RTO oxide of the dielectric layer, little or no RTO oxide is consumed so that a thickness of the dielectric layer is maintained in contrast to LTO oxides that are largely consumed during formation of the conductive member.

Advantageously, the substrate absorbs light over a broad wavelength (e.g., over visible, infrared, or ultraviolet wavelengths) with high efficiency in production of charge carriers. The conductive member, dielectric layer, and metal contact are thin enough or transparent to transmit light to the substrate. Furthermore, the photoactive can be scaled to various sizes from nanometer sizes to extended sizes such as several centimeters. In addition, a plurality of photoactive articles can be used together in an array, and they can be electrically connected to one another in serial or parallel.

The photoactive article can be used for producing an electrical response from incident light, electrochemically converting reactants to products, coupling chemical species together to form adduct or reactant products, energy storage, energy production, position sensitive detection, and the like, or a combination thereof.

In an embodiment, an electrochemical reaction proceeds by introducing a reactant in the electrolyte, contacting the reactant with the electrode, producing an initial product from the reactant, contacting the initial product and the conductive member, and forming a final product from the initial product. According to an embodiment, with reference to FIG. 10, a reactant (e.g., water) contacts electrode 34, produces $O_2$ and $H^+$, which contacts conductive member 14 to evolve $H_2$ and $O_2$. That is, $O_2$ is evolved at electrode 34 while $H_2$ is evolved at conductive member 14. $O_2$ can be collected and stored for subsequent use, and $H_2$ is collected and stored in receiver 56. As the electrochemical reaction proceeds, the electrolyte 16 can be consumed. The electrolyte 16 can be replenished from delivery member 54 through conduit 55.

In an embodiment, the reactant is a separate species from the electrolyte 16. In another embodiment, electrolyte 16 is the reactant, and the electrolyte 116 can be regenerated from an electrochemical reaction that involves reacting the final product with a reagent (which can include an initial product P1 or P2). According to an embodiment, reactant $H_2O$ electrochemically forms initial products $H^+$ and $O_2$. $H^+$ electrochemically forms final product $H_2$. Subsequently, final product $H_2$ reacts with initial product $O_2$ to produce (e.g., reform) reactant $H_2O$, which can be used to in this regenerative electrochemical cycle.

The electrochemical reaction occurs due to charge carriers produced in the substrate that are transmitted to the conductive member. Without wishing to be bound by theory, it is believed that the semiconductor in the substrate absorbs light and creates a plurality of charge carriers such as a plurality of hole ($h^+$) and electron ($e^-$) pairs. The holes and electrons are mobile in the substrate but move in opposite directions within the substrate, depending on a direction of an electric field across the photoactive article. In one embodiment, electrons move toward the conductive member, and holes move away from the conductive member and dielectric layer but move toward the metal contact. In another embodiment, holes move toward the conductive member, and electrons move away from the conductive member and dielectric layer but move toward the metal contact. According to an embodiment, at an interface of the conductive member and the electrolyte, the electrons are involved in an electrochemical half-reaction, e.g., reducing protons to hydrogen.

Beyond forming $H_2$ and $O_2$ from H2O in an electrochemical system, the photoelectrochemical article can be used in numerous other electrochemical reactions. Such electrochemical reactions can produce exemplary products that include alcohols (e.g., methanol, ethanol, and the like), alkanes (e.g., ethane, methane, and the like), alkenes (e.g., ethene, benzene, and the like), aldehydes (e.g., formaldehyde), ethers, esters, carboxylic acids, and the like.

The apparatus and processes herein are further illustrated by the following examples, which are non-limiting.

EXAMPLES

Example 1

Making Photoactive Article

A photoactive article (referred to in the subsequent Examples as "article") was fabricated using p-doped CZ Si(100) wafers (1 Ohm-cm to 5 Ohm-cm, 550 um thick, WRS materials). Wafers were treated by a standard Radio Corporation of American (RCA) cleaning procedure that included immersion steps in standard clean 1 (SC1) composition (5:1:1 $H_2O:NH_4OH:H_2O_2$, by volume), 2% HF, and a standard clean 2 (SC2) composition (5:1:1 $H_2O:HCl:H_2O_2$, by volume). Wafers were dried in a spin rinse dryer and transferred to a rapid thermal processing system (model RTP-600xp available from Modular Process Technology). $SiO_2$ dielectric layers were formed at 950° C. in 8% O2/N2, cooled to 250° C., and annealed to 1000° C. The wafers were maintained for 60 seconds (s) in $N_2$ followed by an additional 60 s in 10% $H_2/N_2$ to form an RTO oxide. The RTO oxide thickness was adjusted by varying the time of the RTO treatment. Thickness was measured by ellipsometry. Thicknesses typically varied by less than 1% across a wafer. RTO oxide thickness was calculated from a (Si/SiOx) signal ratio obtained from angular resolved X-ray photoelectron spectroscopy, which gave good agreement (within 9%, absolute) with thicknesses determined from ellipsometry for RTO $SiO_2$ layers. Ordered arrays of metallic conductive members were formed on the RTO SiO2 through shadow masks at 1 A $s^{-1}$ by e-beam evaporation. Pt (99.99%) and Ti (99.99%) layers were sequentially disposed without breaking vacuum and without substrate heating. Film thicknesses were monitored with quartz crystal thickness monitors. A single-layer mask was employed for the conductive member arrangement of 500 um diameter members, and 850 µm pitch. A bilayer mask (available from Photon Sciences) was used for smaller dimensions. Indium metal contacts were soldered onto each sample with a soldering iron at 215° C.

Figure 17:
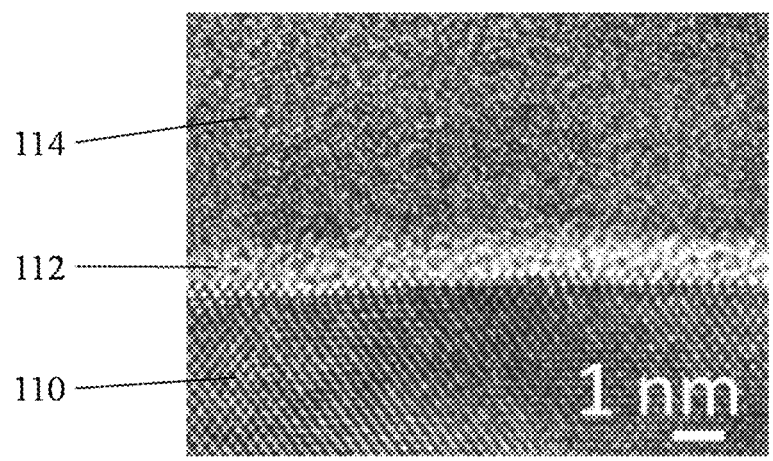
FIGS. 17 and 18 show a micrograph of a photoactive article according to Example 1.

A transmission electron micrograph of a transverse cross-section of a portion of the photoactive article is shown in FIG. 17. RTO SiO2 layer 112 occurs between the Si layer 110 and the Ti layer 114 and has a thickness of greater than 1 nm and was not consumed when depositing Ti layer 132 thereon. RTO $SiO_2$ is resistant to being consumed when forming the Ti layer 132. As a result, formation of metal-induced gap states (MIGS) were suppressed. Consequently, the photoactive article has a lower dark saturation current density, higher photovoltage (also referred to as open circuit voltage, $V_{oc}$), and higher conversion efficiency as compared with a comparative device that includes LTO SiO2 discussed in Example 2.

Figure 18:
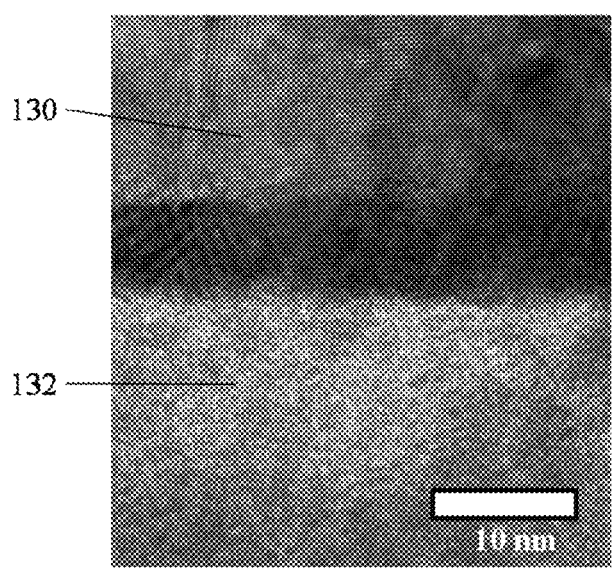

Additionally, FIG. 18 shows a micrograph of a transverse cross-section of that were formed on RTO SiO2 layer 112. Inclusion of Pt layer 130 and Ti layer 132 on SiO2 layer 112 provides an active catalyst for a hydrogen evolution reaction (HER) or oxygen evolution reaction and also provides a low-work function metal for the photoactive article.

Example 2

Making Comparative Device

A comparative device (referred to in the subsequent Examples as "comparative device") was made by treating p-doped CZ Si(100) wafers (1 Ohm-cm to 5 Ohm-cm, 550 um thick, WRS materials) with the standard Radio Corporation of American (RCA) as in Example 1. An LTO $SiO_2$ layer was grown on the wafer by subjecting the wafer to room temperature oxidation in an $O_2$ atmosphere for 2 hours. The LTO oxide thickness was adjusted by varying the time of the room temperature $O_2$ exposure. Thickness was measured by ellipsometry. Thicknesses typically varied by less than 1% across a wafer. The LTO oxide thickness was calculated from a (Si/SiOx) signal ratio obtained from angular resolved X-ray photoelectron spectroscopy, which gave good agreement (within 9%, absolute) with thicknesses determined from ellipsometry for LTO $SiO_2$ layers. Ordered arrays of metallic conductive members were formed on the LTO SiO2 through shadow masks at 1 A s-1 by e-beam evaporation. Pt (99.99%) and Ti (99.99%) layers were sequentially disposed without breaking vacuum and without substrate heating. Film thicknesses were monitored with quartz crystal thickness monitors. A single-layer mask was employed for the conductive member arrangement of 500 um diameter members, and 850 µm pitch. A bilayer mask (available from Photon Sciences) was used for smaller dimensions. Indium metal contacts were soldered onto each sample with a soldering iron at 215° C.

Figure 19:
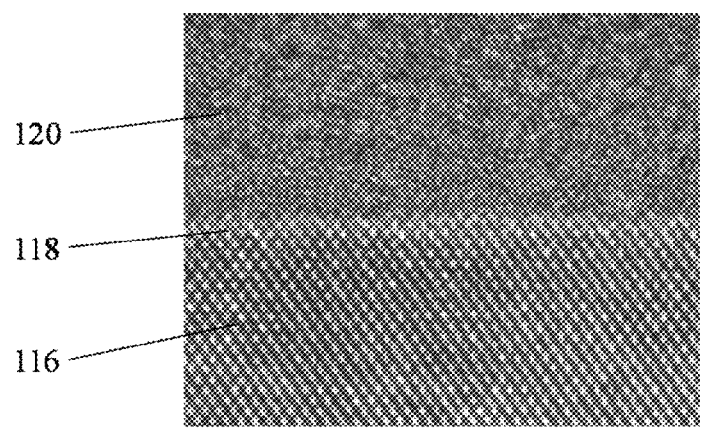
FIG. 19 shows a micrograph of a comparative device according to Example 2.

A transmission electron micrograph of a transverse cross-section of a portion of the comparative device article is shown in FIG. 19. It was found that LTO $SiO_2$ layer 118 formed on the Si layer 116 was largely consumed during formation of Ti layer 120. As a result, LTO SiO2 layer 118 is exceedingly thin and has a thickness less than_nm.

Example 3

Minority Carrier Diffusion Length

A minority carrier diffusion length was determined for the article of Example 1 and the comparative device of Example 2 with the following physical modifications of each: an ammeter was connected in series between the indium metal contact and the Pt metal layer in each of the article and comparative device. A laser having a wavelength at 532 nm in continuous wave operation (average power 22.4 microwatts, beam diameter 25 µm) was directed onto the article or comparative device to achieve the arrangement shown in FIG. 13. A relative position of the laser and article (or comparative device) was varied, and the photocurrent generated by photo absorption of the Si substrate was monitored using the ammeter.

Figure 20:
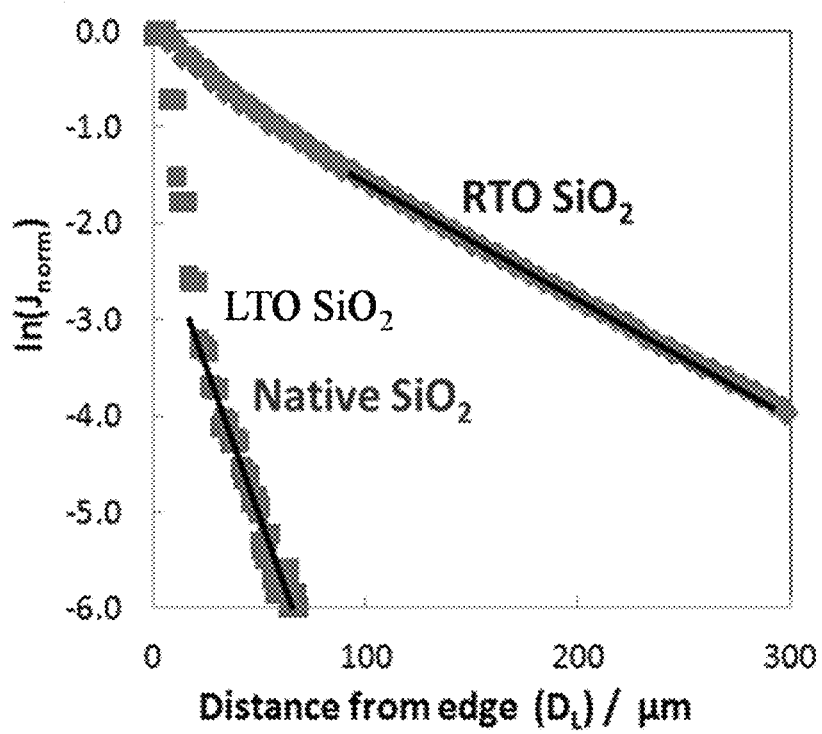
FIG. 20 shows a graph of current density versus a distance from a conductive member for light impinging on a photoactive article or a comparative device according to Example 3.
Figure 21:
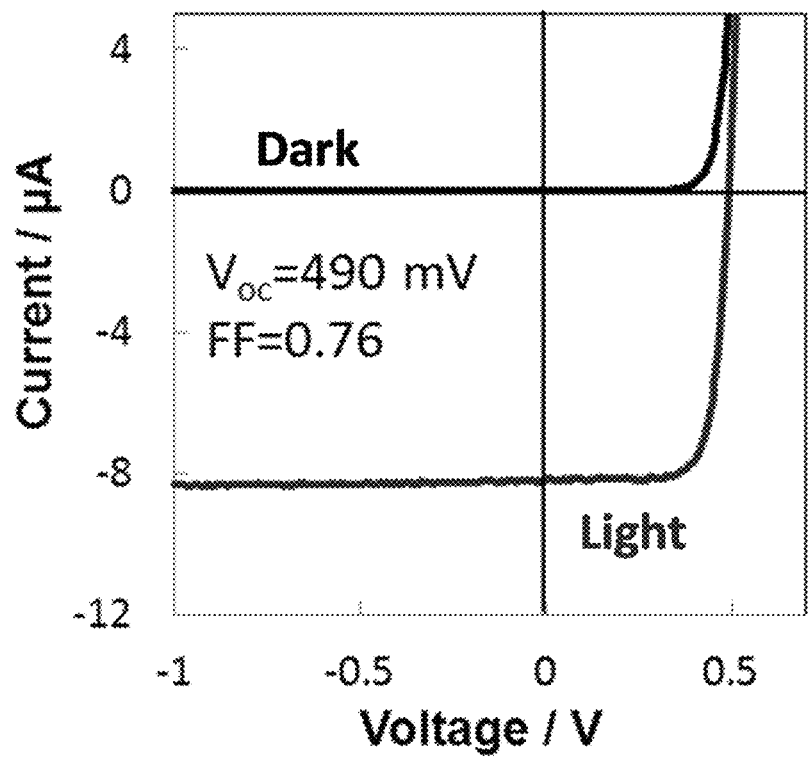
FIGS. 21 and 22 respectively show a graph of current versus voltage for a photoactive article and comparative device according to Example 3.

FIG. 20 shows a graph of the natural logarithm of the measured photocurrent J versus a distance between the edge of the Pt—Ti layers and the location of the laser on the $SiO_2$ layer. The photocurrent output from the article is labelled "RTO $SiO_2$" while that for the comparative device is labelled "LTO $SiO_2$". A linear regression of the data shown in FIG. 20 was used to determine the minority carrier diffusion length ($L_e$) for the article and comparative device, which were respectively 82±8 µm (article) and 12±4 µm (comparative device). Thus, the article had an ~7 times increase in effective minority carrier diffusion length due the RTO $SiO_2$ layer. Advantageously, the RTO $SiO_2$ gave a higher quality Si/SiO2 interface with fewer defects that led to the large increase in effective minority carrier diffusion length for the article.

Figure 22:
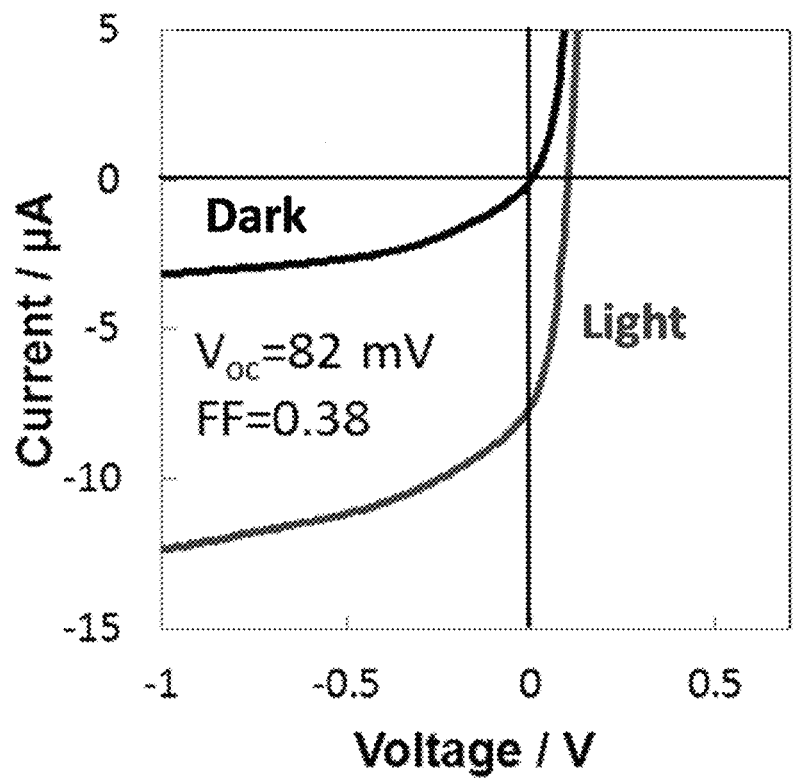
Figure 23:
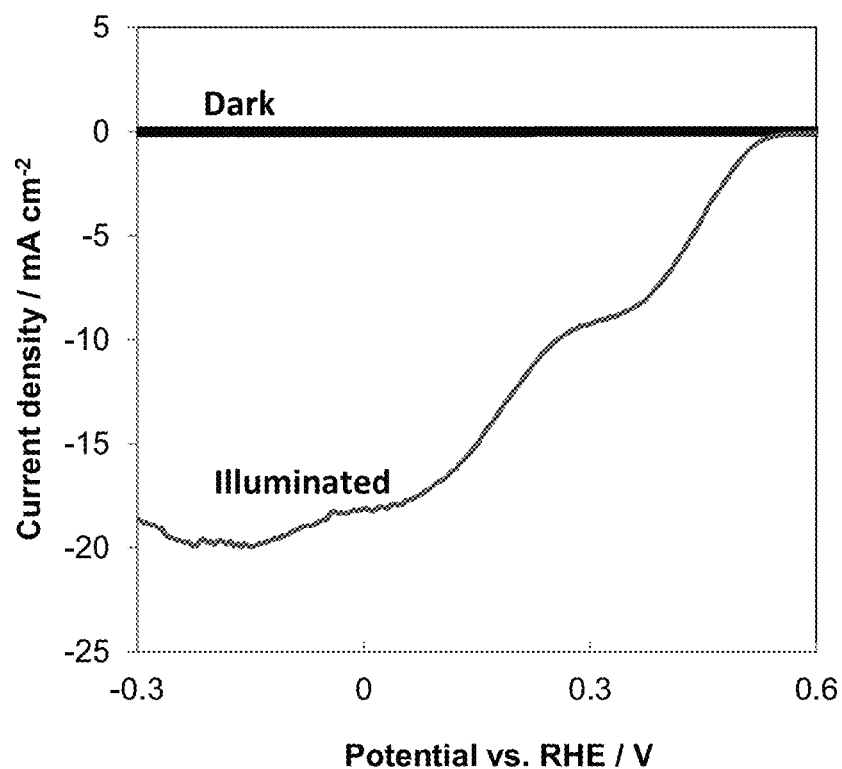
FIG. 23 shows a graph of current density versus potential vs. RHE for a second article according to Example. 4.

Additionally, current as a function of voltage was measured for the article and comparative device, the results of which are shown respectively in FIGS. 22 and 23.

Example 4

Current-Voltage Performance of Exemplary Photoactive Article with Electrolyte A second photoactive article (referred to herein as "second article") was made following the procedure in Example 1. The second article included a substrate of p-Si(100), a 2 nm-thick RTO SiO2 layer, and conductive members (20 nm thick Pt on 30 nm thick Ti) each having a circular cross-section with a diameter of 23 µm and pitch of 53 µm. An ammeter was connected between two adjacent conductive members, and the second article was immersed in dearated 0.5 M $H_2SO_4$. The second article was then subjected to illumination using a Xe arc lamp light source with a AM 1.5 Global filter (model 81388) that produced a simulated solar spectrum according to AM 1.5 light source standard ASTM G173 at an intensity ~100 mW/$cm^2$. The current-voltage performance curve of the second source is shown in FIG. 23.

Example 5

Sensitivity of Article and Comparative Device

Figure 24:
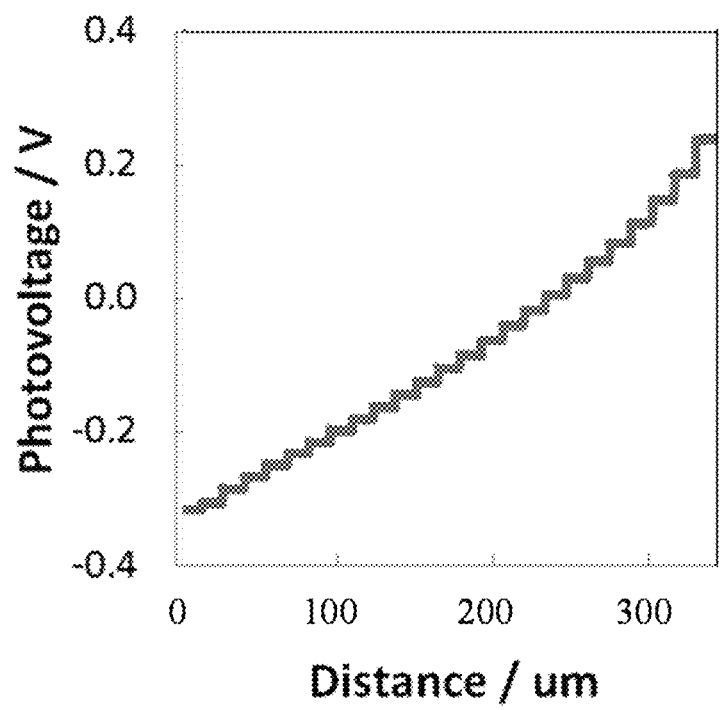
FIGS. 24 and 25 respectively show a graph of photo voltage versus distance from a conductive member for light impinging on a photoactive article or comparative device according to Example 5.
Figure 25:
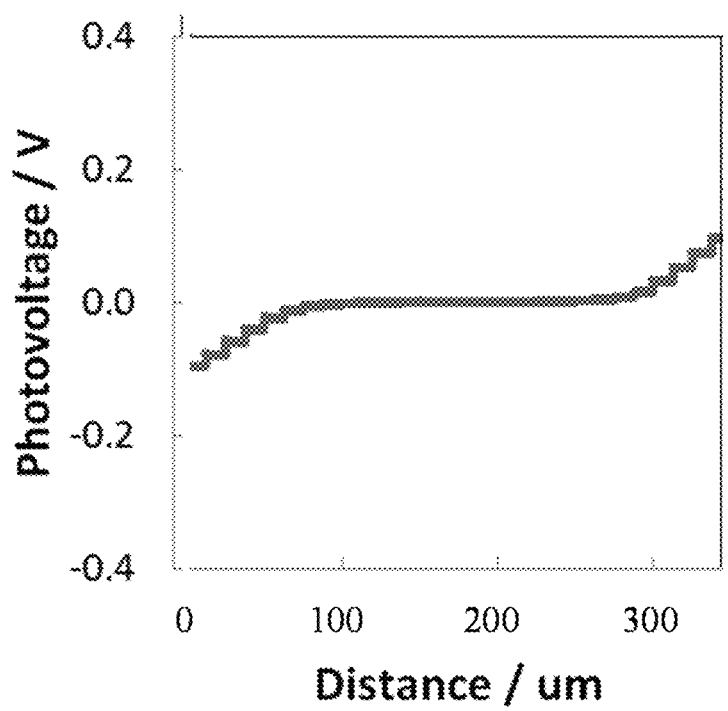
Figure 26:
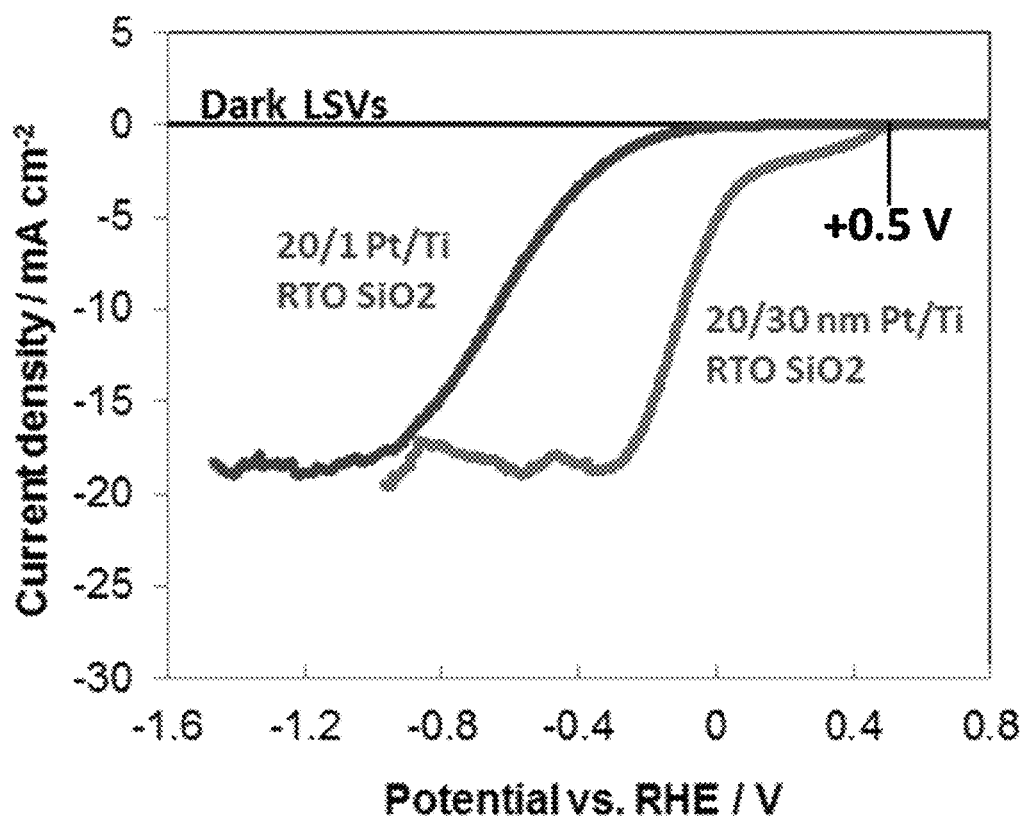
FIG. 26 shows a graph of current density versus potential for a third article and a fourth article according to Example 6.

Sensitivity of the response of the article and comparative device were investigated. Here, photovoltage output versus distance between the laser and Pt/Ti conductive members was measured at a laser power of 19 µW at 532 nm (for article) or 45 mW at 532 nm (for comparative device). Graphs of the results are shown in FIGS. 24 and 25 respectively for the article and comparative device. The curve in FIG. 24 for the article shows a linear response and enhance sensitivity over the curve in FIG. 25 for the comparative article. Inclusion of RTO SiO2 layer increased the performance of the article in relation to performance of the comparative device having LTO SiO2 that exhibits no change in photovoltage over a large range (~100 µm to 250 µm) of laser position distances.

Example 6

Conductive Member Components

A third article and fourth article were made following the procedure in Example 1 with the following modifications of the conductive member: the third article had a 20 nm Pt layer disposed on a 1 nm Ti layer; the fourth article had a 20 nm Pt layer disposed on a 30 nm Ti layer. The third article 3 and fourth article contained RTO $SiO_2$.

The third and fourth articles were subjected to AM 1.5 illumination during immersion in 0.5 M $H_2SO_4$. A linear sweep voltammogram was acquired for the third and fourth articles, and the results are shown in the graph appearing in FIG. 27. The fourth article having a thicker layer of Ti had a significantly greater photovoltage that did the thin Ti layer included in the third article. The 1 nm thick Ti layer in the third article served mainly as an adhesion layer for the Pt layer and had minimal effect on the effective work function of the conductive member.

Figure 27:
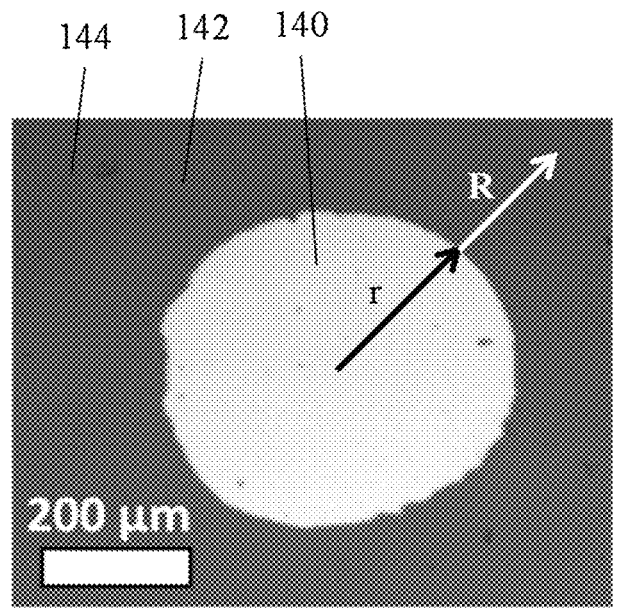
FIGS. 27 and 29 respectively show a photograph of a photoactive article with an electrolyte disposed thereon and a photograph of the photoactive article without an electrolyte disposed thereon according to Example 7.

As shown in FIG. 27 the third and fourth article had open circuit voltages that were respectively 0 mV and 490 mV.

Example 7

External Quantum Efficiency (EQE)

An EQE was determined for a fifth article that was prepared according to the procedure for making the article except the conductive member was 20 nm thick Pt on 30 nm thick Ti with a circular cross-section and diameter of 400 µm formed on RTO $SiO_2$. A photograph of the fifth article is shown in FIG. 27, which shows the Pt/Ti conductive member 140 and RTO SiO2 layer 142 144 disposed in $H_2SO_4$ electrolyte 144. A radial distance r from a center of the Pt/Ti conductive member 140 is shown as is radial distance R from a periphery of the Pt/Ti conductive member 140.

Figure 28:
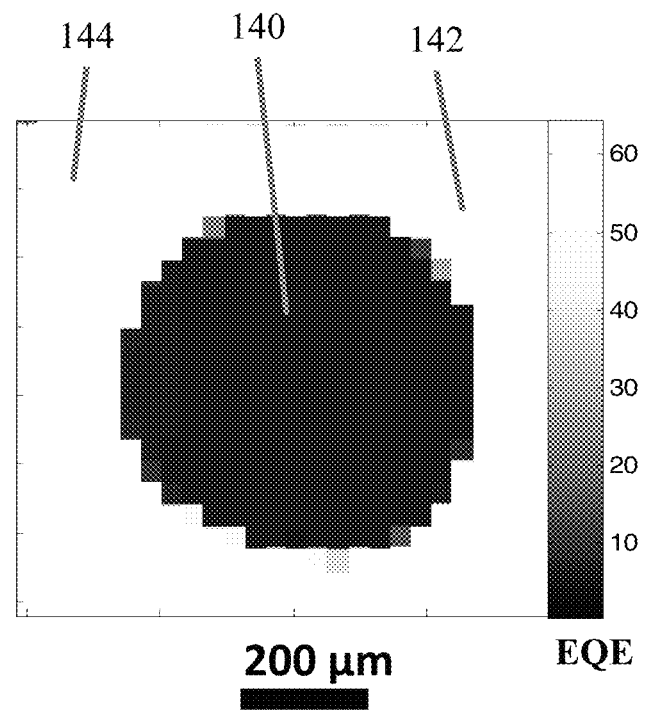
FIGS. 28 and 30 respectively show an equivalent quantum efficiency (EQE) map of a photoactive article with an electrolyte disposed thereon and a photocurrent map of the photoactive article without an electrolyte disposed thereon according to Example 7.

The fifth article was subjected immersion in 0.5 M $H_2SO_4$. EQE image data was acquired under application of −0.1 V bias of the fifth article and illumination with 532 nm laser with 23 µW power. The EQE map is shown in FIG. 28 with a grey scale legend shown to the right of the map. EQE values are reported as a percentage of photons converted to photocurrent, which range from 0 to 100%.

Figure 29:
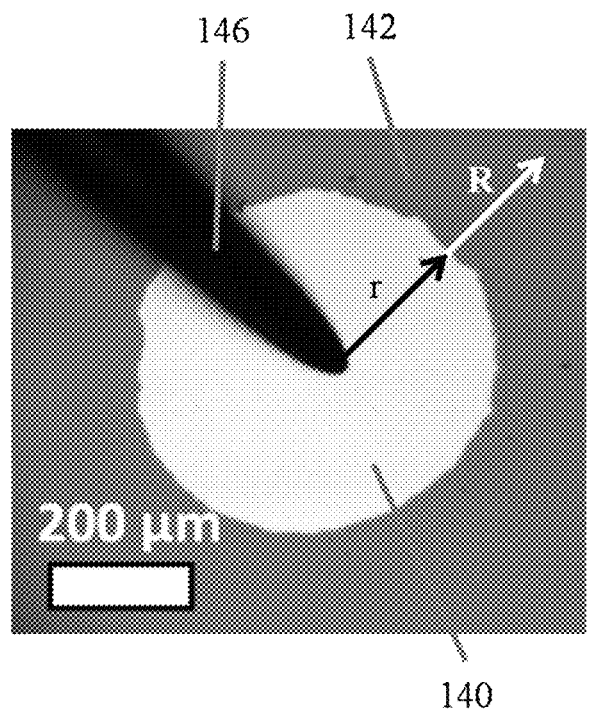
Figure 30:
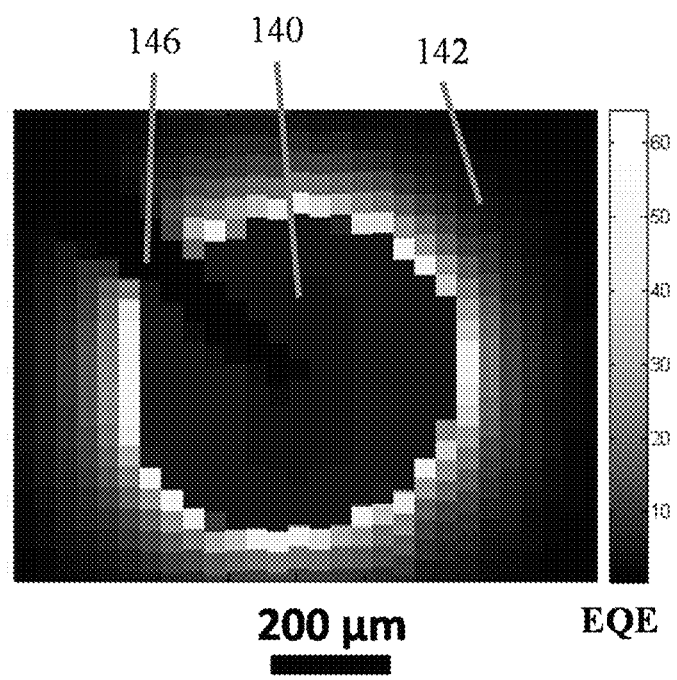
Figure 31:
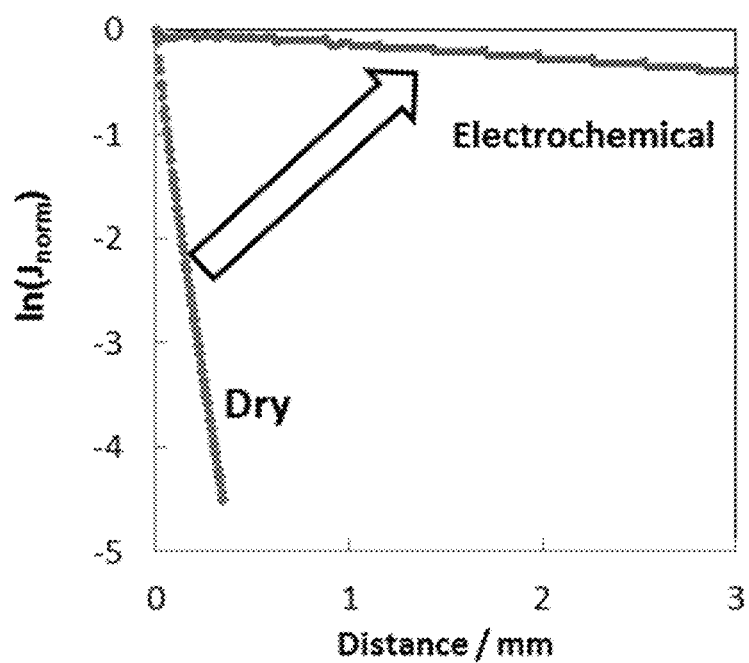
FIG. 31 shows a graph of current versus distance of a laser impinging on the photoactive articles shown in FIGS. 27 and 29 according to Example 8.

The fifth article was removed from the $H_2SO_4$ bath, rinsed with distilled, deionized water, and dried. As shown in the photograph of the fifth article appearing in FIG. 29, a probe 146 contacted the Pt/Ti conductive member 140. The probe was electrically connected to the indium metal contact attached to the substrate in order to monitor a photocurrent signal of the fifth article. While dry, the fifth article again was subjected to acquisition of EQE image data under application of −0.1 V bias of the fifth article and illumination with 532 nm laser with 23 µW power. The EQE map for the dry fifth article is shown in FIG. 30 with a grey scale legend shown to the right of the map. EQE values are reported as a percentage of photons converted to photocurrent, which range from 0 to 100%.

The EQE map shown in FIG. 28 indicates that the fifth article immersed in an electrolyte has a high EQE that extends from the periphery (R=0) for hundreds of microns. In contrast, the EQE map shown in FIG. 30 indicates that the fifth article without an electrolyte has an EQE that extends from the periphery (R=0) for a shorter length of ~30 µm. Thus, charge carrier collection occurred at much greater distances (e.g., R>100 µm) in the presence of the electrolyte. Without wishing to be bound by theory, it is believed that the increase in the distance for EQE intensity can be attributed to an electrolyte-induced inversion layer.

Example 8

Position Sensitivity of Fifth Article

As in Example 7, the fifth article was subjected to immersion in the $H_2SO_4$ bath and the laser position was scanned radially outward from the periphery (R=0 µm) of the Pt/Ti conductive member as the current density and potential were measured. The experiment was repeated after the fifth article was removed from the H2SO4 bath, rinsed, and dried. Here, the laser was operated at 532 nm with 19 µW average power.

Figure 32:
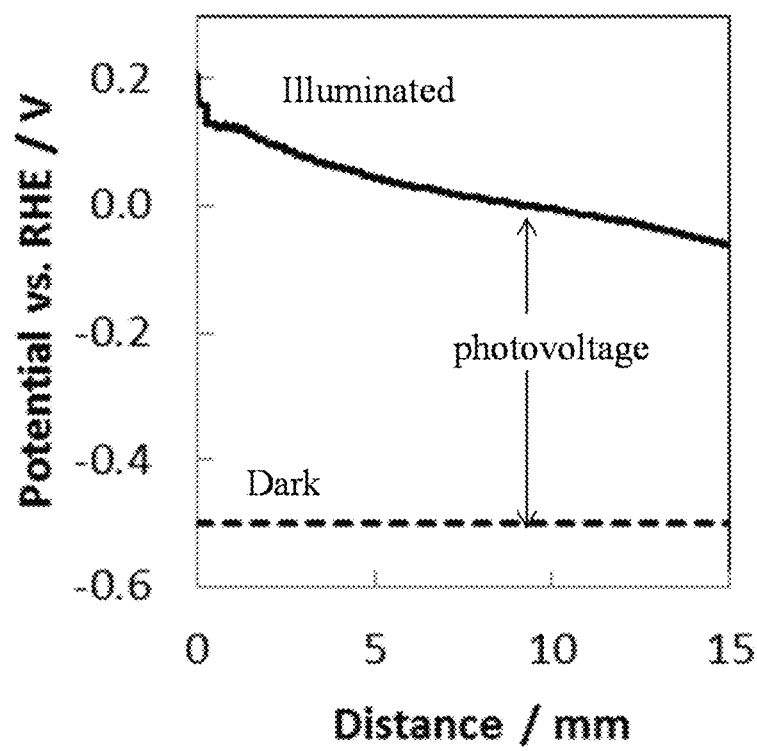
FIGS. 32 and 33 respectively show a graph of potential versus distance for a laser impinging on the photoactive article shown in FIG. 27 and a graph of voltage versus distance for a laser imputing on the photoactive article shown in FIG. 29 according to Example 8.
Figure 33:
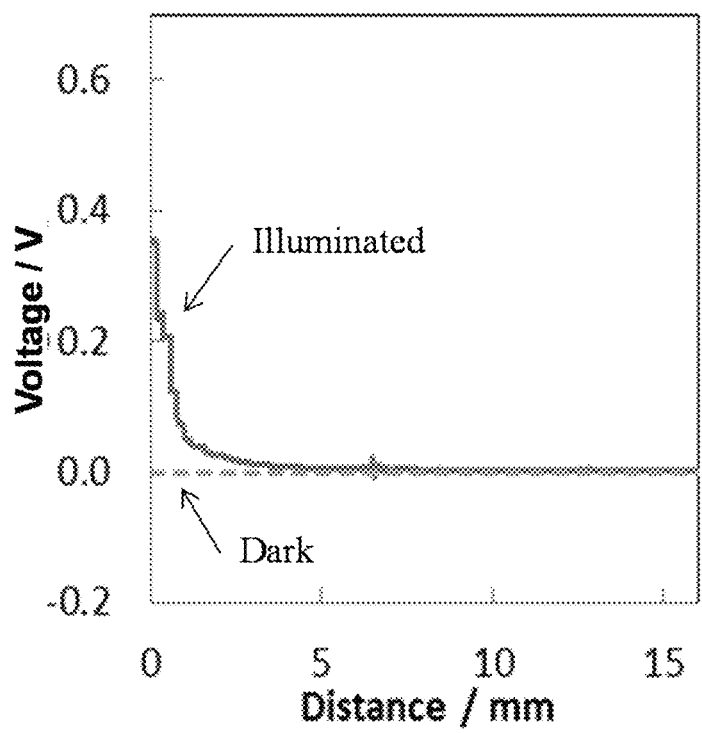
Figure 34:
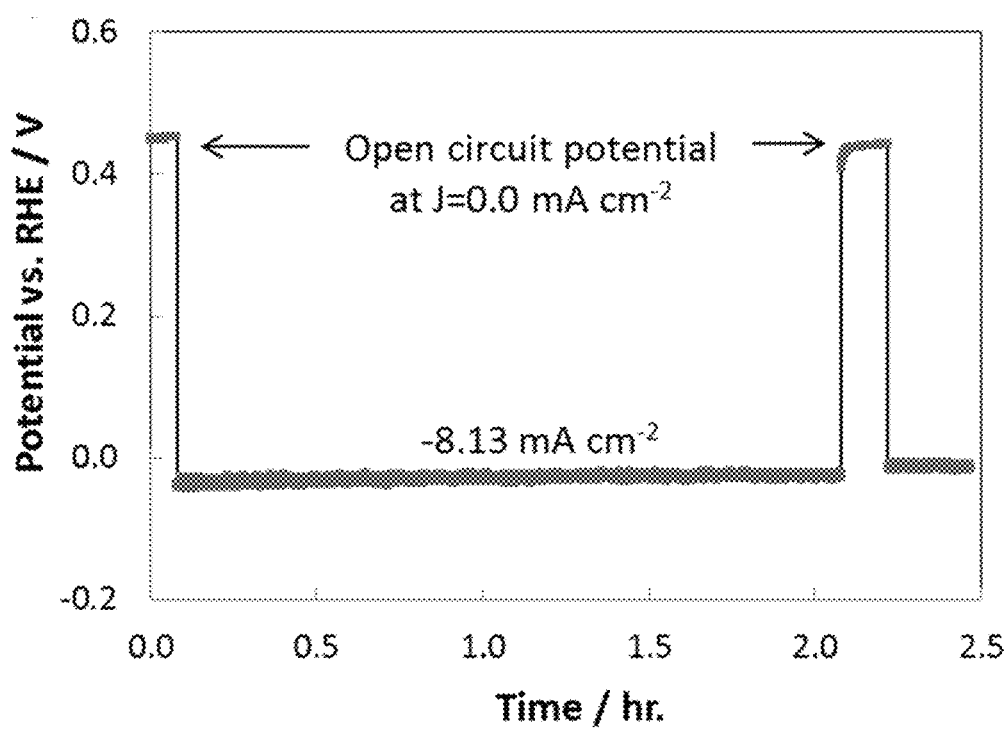
FIG. 34 shows a graph of potential versus time for a photoactive article according to Example 9.

Results are shown in FIGS. 32, 33, and 34. Referring to FIG. 32, the minority carrier diffusion length Le for the fifth article immersed in $H_2SO_4$ (upper curve, labelled as "electrochemical") was 7.5 mm and for the dry fifth article (lower curve, labelled as "dry") was 80 µm. Similarly, FIGS. 32 and 33 respectively show the potential v. RHE and voltage for the fifth article respectively in H2SO4 (FIG. 32) and dry (FIG. 33). Operating the fifth article in the presence of electrolyte provided long-distance charge carrier collection, resulting in high photovoltage with a linear response at distances up to 2 cm. However, operating the fifth article without an electrolyte drastically reduces the distance at which photovoltage is above baseline values.

Example 9

Temporal Stability

A chronopotentiometry (constant current) stability measurement was performed on the article having a 20/30 nm Pt/Ti conductive member on a 2 nm RTO SiO2 layer that was formed on a p-Si(100) substrate. The article was immersed in H2-purged 0.5 H2SO4 and subjected to AM 1.5 light. The potential (vs RHE) was collected as a function of time, and the results are shown in FIG. 34. The constant potential observed under operation demonstrated that the article was temporally stable with repeated operability in evolving $H_2$.

While one or more embodiments have been shown and described, modifications and substitutions may be made thereto without departing from the spirit and scope of the invention. Accordingly, it is to be understood that the present invention has been described by way of illustrations and not limitation. Embodiments herein can be used independently or can be combined.

All ranges disclosed herein are inclusive of the endpoints, and the endpoints are independently combinable with each other. The ranges are continuous and thus contain every value and subset thereof in the range. Unless otherwise stated or contextually inapplicable, all percentages, when expressing a quantity, are weight percentages. The suffix "(s)" as used herein is intended to include both the singular and the plural of the term that it modifies, thereby including at least one of that term (e.g., the colorant(s) includes at least one colorants). "Optional" or "optionally" means that the subsequently described event or circumstance can or cannot occur, and that the description includes instances where the event occurs and instances where it does not. As used herein, "combination" is inclusive of blends, mixtures, alloys, reaction products, and the like.

As used herein, "a combination thereof" refers to a combination comprising at least one of the named constituents, components, compounds, or elements, optionally together with one or more of the same class of constituents, components, compounds, or elements.

All references are incorporated herein by reference.

The use of the terms "a" and "an" and "the" and similar referents in the context of describing the invention (especially in the context of the following claims) are to be construed to cover both the singular and the plural, unless otherwise indicated herein or clearly contradicted by context. "Or" means "and/or." It should further be noted that the terms "first," "second," "primary," "secondary," and the like herein do not denote any order, quantity, or importance, but rather are used to distinguish one element from another. The modifier "about" used in connection with a quantity is inclusive of the stated value and has the meaning dictated by the context (e.g., it includes the degree of error associated with measurement of the particular quantity). The conjunction "or" is used to link objects of a list or alternatives and is not disjunctive; rather the elements can be used separately or can be combined together under appropriate circumstances.

What is claimed is:

1. A photoactive article comprising:
a substrate comprising a semiconductor to absorb light and to produce a plurality of charge carriers;
a dielectric layer disposed on the substrate;
a conductive member disposed on the dielectric layer and opposing the substrate such that the dielectric layer is exposed by the conductive member, the conductive member to receive a portion of the plurality of charge carriers from the substrate, the charge carries being transmitted through the dielectric layer from the substrate to the conductive member; and
an electrolyte disposed on the dielectric layer and the conductive member.

2. The photoactive article of claim 1, wherein the substrate comprises Si, Ga, Ge, As, In, Sn, Sb, Te, Hf, Zn, Hg, Pb, Cd, Se, P, N, Sn, Bi, S, B, C, O, F, Cl, Br, I, or a combination comprising at least one of the foregoing.

3. The photoactive article of claim 2, wherein the dielectric comprises an oxide of the semiconductor, a ceramic, a glass, or a combination comprising at least one of foregoing.

4. The photoactive article of claim 3, wherein the dielectric is the oxide of the semiconductor, the oxide being a product of rapid thermal oxidation of the semiconductor.

5. The photoactive article of claim 1, wherein the conductive member comprises:
a first metal disposed on the dielectric layer; and
a second metal disposed on the first metal,
wherein the first metal and second metal are arranged in a plurality of layers.

6. The photoactive article of claim 5, wherein the portion of the plurality of charge carriers comprises a plurality of electrons, and the first metal has a work function that is less than a work function of the semiconductor; or
the portion of the plurality of charge carriers comprises a plurality of holes, and the first metal has a work function that is greater than a work function of the semiconductor.

7. The photoactive article of claim 5, wherein a plurality of conductive members are disposed on the dielectric layer such that the conductive members are electrically isolated from each other.

8. The photoactive article of claim 5, wherein the first metal and the second metal independently comprise a transition metal, an alkaline earth metal, an alkali metal, a rare earth metal, or a combination comprising at least one of the foregoing, and
the first metal and the second metal are independently a layer, a nanoparticle, a porous layer, a powder, a foam, or a combination comprising at least one of the foregoing.

9. The photoactive article of claim 1, wherein the electrolyte comprises a fluid, a solid, or a combination comprising at least one of the foregoing.

10. The photoactive article of claim 9, wherein the electrolyte is the fluid that comprises water, an acid, an alcohol, a plurality of ions, or a combination comprising at least one of the foregoing.

11. The photoactive article of claim 9, wherein the electrolyte is the solid that comprises a polymer, a metal, a plurality of colloidal particles, a salt, or a combination comprising at least one of the foregoing.

12. The photoactive article of claim 1, further comprising a metal contact disposed on the substrate opposing the dielectric layer.

13. The photoactive article of claim 12, further comprising an electrode arranged such that the electrolyte is interposed between the conductive member and the electrode.

14. The photoactive article of claim 13, further comprising a conductor that electrically interconnects the metal contact and the electrode,
wherein the photoactive article is configured to produce electrochemically a product from a reactant.

15. The photoactive article of claim 14, further comprising a membrane disposed between the conductive member and the electrode, a photovoltaic device disposed on the substrate or disposed on the electrode, or a combination comprising at least one of the foregoing.

16. The photoactive article of claim 1, further comprising an electrode disposed on the dielectric layer and separated from the conductive member,
wherein the photoactive article is configured to produce an electrical signal between the conductive member and the electrode in response to light impinging on the photoactive article, an amplitude of the electrical signal being proportionate to a distance between a location of the light incident on the photoactive article and the conductive member.

17. The photoactive article of claim 1, wherein the photoactive article is configured to form electrochemically an initial product from a reactant and to produce hydrogen from the initial product.

18. A photoactive article comprising:
a substrate comprising a semiconductor to absorb light and to produce a plurality of charge carriers in response to absorption of light;
a dielectric layer disposed on the substrate and comprising a semiconductor oxide produced by rapid thermal oxidation of the semiconductor; and
a conductive member disposed on the dielectric layer and opposing the substrate such that the dielectric layer is exposed by the conductive member, the conductive member to receive the plurality of charge carriers from the substrate, the charge carries being transmitted through the dielectric layer from the substrate to the conductive member.

* * * * *